(12) United States Patent
Yu et al.

(10) Patent No.: US 11,035,065 B2
(45) Date of Patent: Jun. 15, 2021

(54) LAUNDRY PROCESSING APPARATUS

(71) Applicant: LG ELECTRONICS INC., Seoul (KR)

(72) Inventors: Insik Yu, Seoul (KR); Youngjong Kim, Seoul (KR); Youngjun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 230 days.

(21) Appl. No.: 15/558,667

(22) PCT Filed: Mar. 15, 2016

(86) PCT No.: PCT/KR2016/002556
§ 371 (c)(1),
(2) Date: Sep. 15, 2017

(87) PCT Pub. No.: WO2016/148478
PCT Pub. Date: Sep. 22, 2016

(65) Prior Publication Data
US 2018/0112345 A1    Apr. 26, 2018

(30) Foreign Application Priority Data

Mar. 16, 2015   (KR) .................. 10-2015-0036040
Mar. 16, 2015   (KR) .................. 10-2015-0036044

(51) Int. Cl.
| | | |
|---|---|---|
| *D06F 37/24* | (2006.01) | |
| *D06F 39/14* | (2006.01) | |
| *D06F 39/00* | (2020.01) | |
| *D06F 37/40* | (2006.01) | |
| *D06F 39/12* | (2006.01) | |

(Continued)

(52) U.S. Cl.
CPC .............. *D06F 37/24* (2013.01); *D06F 34/28* (2020.02); *D06F 37/20* (2013.01); *D06F 37/40* (2013.01);

(Continued)

(58) Field of Classification Search
CPC ........ D06F 37/20; D06F 37/24; D06F 39/125; D06F 39/005; D06F 37/40; D06F 39/14; D06F 37/268; D06F 34/28; F16F 9/19; F16F 13/005; F16F 15/022; F16F 7/08
See application file for complete search history.

(56) References Cited

U.S. PATENT DOCUMENTS 2,645,107 A *   7/1953   Smith ................ D06F 13/02
                                                68/23.2
2,775,883 A *   1/1957   Burris ................ D06F 37/24
                                                68/23.3

(Continued)

FOREIGN PATENT DOCUMENTS

KR   20-1991-0003156 Y1   5/1991
KR   20-1995-0023334 U    8/1995

(Continued)

OTHER PUBLICATIONS

International Search Report from PCT/KR2016/002556, dated Jul. 26, 2016.

*Primary Examiner* — Benjamin L Osterhout
(74) *Attorney, Agent, or Firm* — Dentons US LLP

(57) ABSTRACT

A laundry processing apparatus according to the present invention comprises: a cabinet; a tub, arranged in the interior of the cabinet, for storing laundry water; longitudinal dampers connecting the cabinet and tub and supporting the tub as same hangs from the cabinet; upper transverse dampers, connecting the upper part of the tub and cabinet, for reducing the horizontal vibration for the tub; and lower transverse dampers, connecting the lower part of the tub and cabinet, for reducing the horizontal vibration for the tub. The laundry processing apparatus according to the present invention allows the transverse dampers coupled structures, and when vibration occurs, the transverse dampers dampen the horizontal vibration and mitigates the vertical vibration through relative motion.

9 Claims, 27 Drawing Sheets

(51) Int. Cl.
*F16F 7/08* (2006.01)
*D06F 37/20* (2006.01)
*D06F 34/28* (2020.01)
*D06F 37/26* (2006.01)
*F16F 9/19* (2006.01)
*F16F 13/00* (2006.01)
*F16F 15/02* (2006.01)

(52) U.S. Cl.
CPC ............ *D06F 39/125* (2013.01); *D06F 39/14* (2013.01); *F16F 7/08* (2013.01); *D06F 37/268* (2013.01); *F16F 9/19* (2013.01); *F16F 13/005* (2013.01); *F16F 15/022* (2013.01)

(56) References Cited

U.S. PATENT DOCUMENTS

| | | | | |
|---|---|---|---|---|
| 5,946,946 A | * | 9/1999 | Sharp | D06F 37/20 188/129 |
| 5,946,947 A | * | 9/1999 | Lee | D06F 37/24 68/23.1 |
| 10,400,379 B2 | * | 9/2019 | Yu | D06F 37/20 |
| 10,774,456 B2 | * | 9/2020 | Yu | D06F 37/24 |
| 2002/0042957 A1 | * | 4/2002 | Kim | D06F 23/04 8/158 |
| 2015/0020552 A1 | * | 1/2015 | Yu | D06F 37/265 68/23.3 |
| 2015/0211164 A1 | * | 7/2015 | Kim | D06F 39/14 68/133 |
| 2016/0083888 A1 | * | 3/2016 | Alexander | D06F 37/24 68/132 |

FOREIGN PATENT DOCUMENTS

| | | |
|---|---|---|
| KR | 10-0195454 B1 | 6/1999 |
| KR | 10-2001-0097184 A | 11/2001 |
| KR | 10-2012-0072833 A | 7/2012 |
| KR | 10-2014-0029013 A | 3/2014 |
| KR | 10-2015-0011215 A | 1/2015 |

* cited by examiner (a)

(b)

(c)

LAUNDRY PROCESSING APPARATUS

TECHNICAL FIELD

This application is a National Stage Entry of International Application No. PCT/KR2016/002556, filed Mar. 15, 2016, and claims the benefit of Korean Application Nos. 10-2015-0036040, filed on Mar. 16, 2015 and 10-2015-0036044 filed on Mar. 16, 2015, all of which are hereby incorporated by reference for all purposes as if fully set forth herein.

The present invention relates to a laundry processing apparatus for reducing the horizontal vibration of a tub.

BACKGROUND ART

In general, a laundry processing apparatus is an apparatus for processing laundry by applying physical and chemical activities to the laundry. A washing machine for removing contaminants included in laundry, a dehydrator for dehydrating the laundry by rotating a washing tub including the laundry at high speed, and a dryer for drying wet laundry by applying cool wind or hot wind into a washing tube is referred as a laundry processing apparatus.

The laundry processing apparatus includes a tub received as same hangs inside a cabinet by a vertical suspension and a drum rotated in the tub to receive laundry (or clothes). The washing machine further includes a pulsator (laundry wing) rotated in the drum.

Since the laundry processing apparatus rotates a drum or a pulsator, vibration occurs. A general laundry processing apparatus includes a device for buffering vibration of the tub.

The vertical suspension according to the related art performs a function for reducing the vertical vibration of the tub.

However, the vertical suspension can buffer only the vertical vibration occurring from the tub but cannot efficiently reduce the horizontal vibration.

In particular, in recent years, in order to improve utility of a residential space, researches and studies have been actively carried out to maximize capability of the tube while maintaining the whole size of the laundry processing apparatus. Accordingly, a gap between the cabinet and the tub is gradually reduced.

However, since collision possibility between the tub and the cabinet is increased when the gap between the cabinet and the tub is reduced, the horizontal vibration of the tub should be efficiently reduced.

DISCLOSURE

Technical Problem

An embodiment of the present invention provides a laundry processing apparatus for efficiently reducing the horizontal vibration of a tub.

Technical Solution

There is provided a laundry processing apparatus including: a cabinet; a tub, arranged in the interior of the cabinet, for storing laundry water; longitudinal dampers connecting the cabinet and tub and supporting the tub as same hangs from the cabinet; upper transverse dampers, connecting the upper part of the tub and cabinet, for reducing the horizontal vibration for the tub; and lower transverse dampers, connecting the lower part of the tub and cabinet, for reducing the horizontal vibration for the tub.

There is provided a laundry processing apparatus including: a cabinet; a tub, arranged in the interior of the cabinet, for storing laundry water; longitudinal dampers connecting the cabinet and tub and supporting the tub as same hangs from the cabinet; an upper guide pin fixed to an upper part of the cabinet and vertically extending long; upper transverse dampers, connecting the upper guide pin and the tub, vertically moving along the upper guide pin, for reducing the horizontal vibration for the tub; a lower guide pin fixed to a lower part of the cabinet and vertically extending long; and lower transverse dampers, connecting the lower guide pin and the tub, vertically moving along the lower guide pin, for reducing the horizontal vibration for the tub.

There is provided a laundry processing apparatus including: a cabinet; a tub, arranged in the interior of the cabinet, for storing laundry water; longitudinal dampers connecting the cabinet and tub and supporting the tub as same hangs from the cabinet; upper transverse dampers, connecting the upper part of the tub and the longitudinal damper, for reducing the horizontal vibration for the tub; a lower guide pin fixed to a lower part of the cabinet and vertically extending long; and lower transverse dampers, connecting the lower guide pin and the tub, vertically moving along the lower guide pin, for reducing the horizontal vibration for the tub.

The above information disclosed in this background section is only for enhancement of understanding of the background of the invention and therefore it may contain information that does not form the prior art that is already known in this country to a person of ordinary skill in the art.

Advantageous Effects

The present invention has following one or more effects.

First, a transverse damper connecting the cabinet and the tub reduces the horizontal vibration of the tub.

Second, the horizontal vibration occurring from an upper part or a lower part of the tub is efficiently reduced by the upper transverse damper or the lower transverse damper.

Third, since at least one of the upper transverse damper or the lower transverse damper may move vertically, the horizontal vibration is reduced while efficiently avoiding stress concentration due to the vertical vibration.

Fourth, since a guide pin is installed in at least one of an inner side or an outer side of the transverse damper and the transverse damper may move relative to the guide pin, the vibration occurring from the tube is efficiently minimized from being propagated to the cabinet.

Fifth, since a lower guide pin is installed in a based, the lower guide pin may efficiently support the vibration propagated to the lower transverse damper.

Sixth, since a pin supporter is arranged in the base, a space in which the lower guide pin is installed may be efficiently used.

Seventh, since the upper transverse damp may be coupled with the longitudinal damper or the upper guide pin, a design freedom of the upper transverse damper can be improved.

Eighth, since the guide pin may be coupled with various configurations of the cabinet, the design freedom may be improved.

Ninth, since an outer side of the transverse damper may vertically move along the guide pin and an inner side of the transverse damper may rotate relative to the tub, vibration occurring from the tub may be efficiently mitigated.

Effects of the present invention may not be limited to the above and other objects and other objects which are not described may be clearly comprehended to those of skill in the art to which the embodiment pertains through the following description.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the. In some instances, known structures and devices are omitted, or are shown in block diagram form focusing on important features of the structures and devices, so as not to obscure the concept of the present invention.

Hereinafter, a top load washing machine is described as an example of a laundry processing apparatus, but the present invention is not limited to the washing machine.

Figure 1:
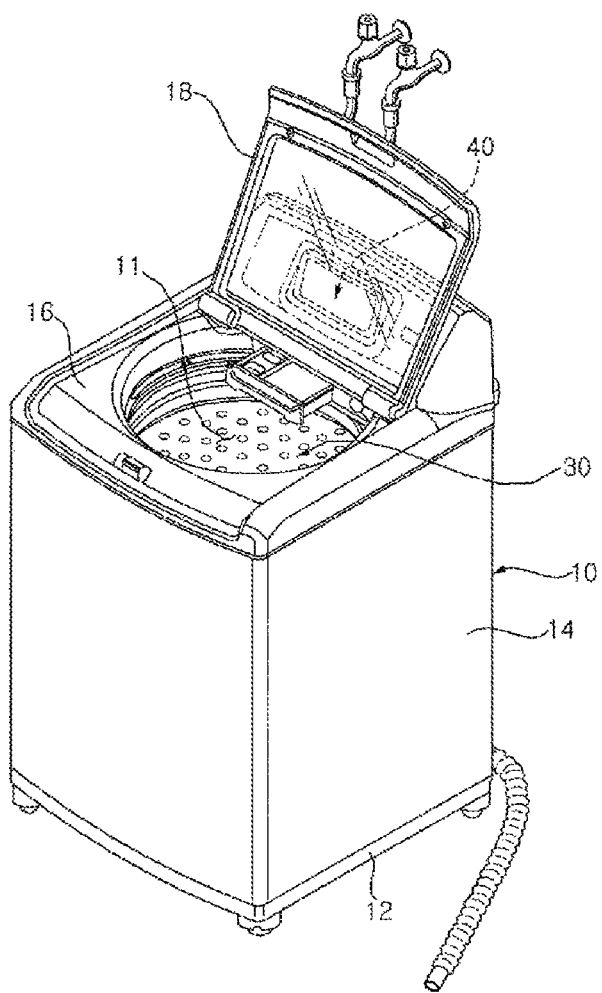
FIG. 1 is a perspective view illustrating a top load washing machine according to a first embodiment of the present invention.
Figure 2:
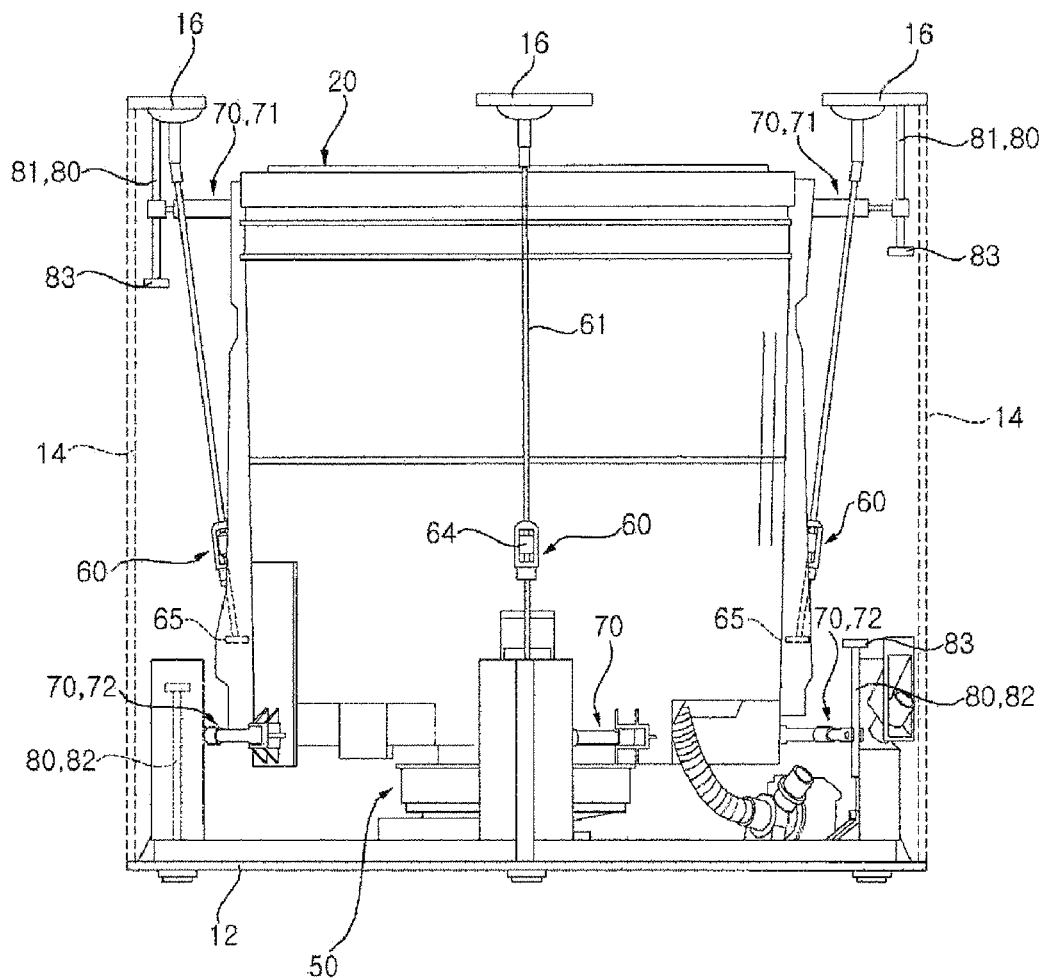
FIG. 2 is a front view illustrating an inside of a top load washing machine shown in FIG. 1.
Figure 3:
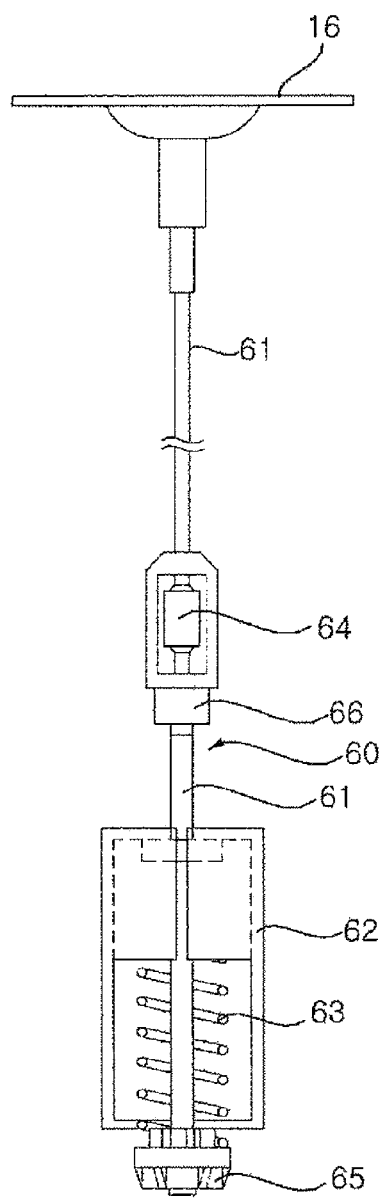
FIG. 3 is a front view illustrating a longitudinal damper shown in FIG. 2.
Figure 4:
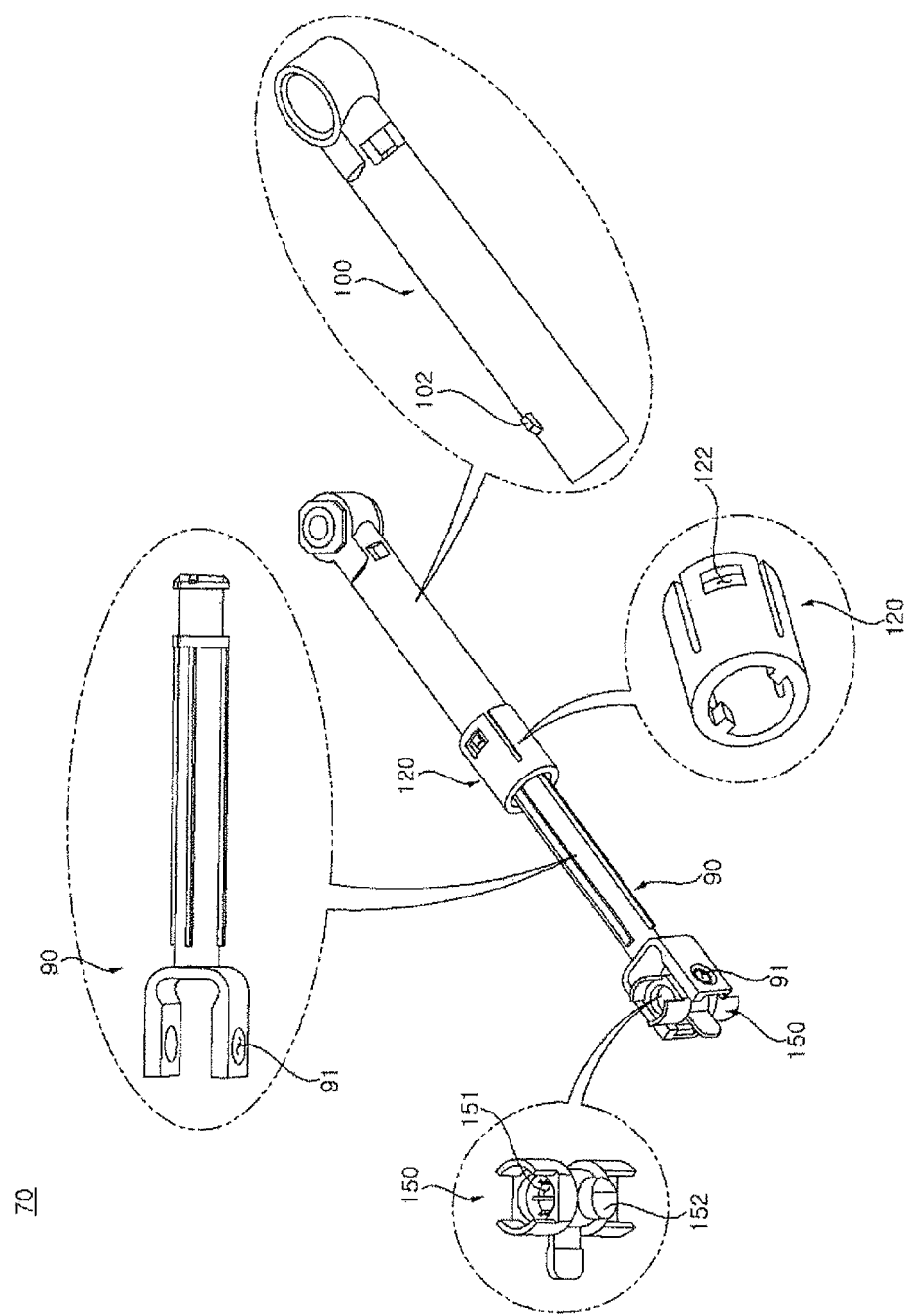
FIG. 4 is a perspective view illustrating a transverse damper shown in FIG. 2.

FIG. 1 is a perspective view illustrating a top load washing machine according to a first embodiment of the present invention, FIG. 2 is a front view illustrating an inside of a top load washing machine shown in FIG. 1, FIG. 3 is a front view illustrating a longitudinal damper shown in FIG. 2, and FIG. 4 is a perspective view illustrating a transverse damper shown in FIG. 2.

A washing machine according to the present embodiment includes a cabinet 10 configured to form an outer appearance; a tub 20 arranged in the interior of the cabinet, for storing laundry water; a drum 30 arranged inside the tub 20 in which the laundry water is loaded so that laundry is performed in the drum 30; a drive module 50 mounted in the tub to rotate the drum 30; longitudinal dampers 60 supporting the tub 20 as same hangs from the cabinet 10; and transverse dampers 70 coupled with the tub 20, for reducing the horizontal vibration for the tub 20.

The cabinet 10 includes a cabinet base 12 placed on the ground; a cabinet body 14 coupled with a peripheral region of the cabinet base 12 to form a lateral surface; a top cover 16 coupled with a upper part of the cabinet body 14 and including a upper part formed therein with an introduction hole 11; and a door 18 installed at the top cover 16 to open/close the introduction hole 11.

The door 18 is arranged therein with a transparent window so that an inside of the door 18 may be observed through the transparent window.

A control module 40 is installed at the top cover 16 so that a user may select a laundry mode and an operation state of the washing machine may be reported to the user.

The tub 20 is arranged in the interior of the cabinet 10.

The drum 30 is installed inside the cabinet 10.

Laundry water is stored in the tub 20 and the drum 30 is partially sunk by the stored laundry water.

A pulsator (not shown) is installed inside the drum 30.

The pulsator is located at a lower side inside the drum 30.

The drive module 50 is installed at a lower side outside of the tub 20.

The drive module 50 includes a drive shaft. The drive shaft is connected to the drum 30 and the pulsator through the tub 20.

At least one of the drum 30 or the pulsator may be driven by operating the drive shaft.

The drive module 50 may selectively drive at least one of the drum 30 or the pulsator, which is a general technology known to those skilled in the art.

The tub 20 is supported by the longitudinal dampers 60 as same hangs from the cabinet 10.

It shall be interpreted that the longitudinal damper 60 mainly buffers vertical vibration but shall not be interpreted that the longitudinal damper 60 buffers only the vertical vibration.

The longitudinal damper 60 is inclined to mainly reduce the vertical vibration during vibration occurring from the tub 20.

A top end of the longitudinal damper 60 is hung at the cabinet 10 and a bottom end of the longitudinal damper 60 is coupled with the tub 20.

The longitudinal damper 60 includes a support rod 61 configured to connect the tub 20 with the cabinet 10; a slider 62 installed at the support rod 61 and integrally moved with the tub 20 along the support rod 61; a damper spring 63 configured to elastically support the slider 62; a supporting end 65 installed at a bottom end of the support rod 61 to support the damper spring 63; and a friction part installed at the support rod 61, moved along the support rod 61, and moving together with the slider 62 during excessive vibration of the tub 2 to provide friction force to the slider 62.

A plurality of longitudinal dampers 60 are arranged around the tub 20. In the present embodiment, four longitudinal dampers are arranged.

In the present embodiment, a top end of the support rod 61 is coupled with a top cover 16 of the cabinet 10. Unlike the present embodiment, the support rod 61 may be coupled at a certain part of the cabinet 10.

The top end of the support rod 61 is hung at the top cover 16 to be pivotally moved. The support rod 61 may perform tuning movement while being hung at the top cover 16.

The supporting end 65 is fixed to a bottom end of the support rod 61. The damper spring 63 is supported at the supporting end 65.

The slider 62 is integrally moved with the tub 20. The slider 62 is moved along the support rod 61.

The damper spring 63 is arranged between the supporting end 65 and the slider 62 and provides elastic force to the slider 62.

The tub 30 is put on the damper spring 63 to be elastically supported.

A friction part housing 66 is installed at the support rod 61 and the friction part 64 is installed inside the friction part housing 66.

When the vibration of the tub 20 is in a normal vibration state of a predetermined level or less, friction due to the friction part 64 is not generated. When the vibration of the tub 20 is in an excessive vibration state greater than the predetermined level, the friction due to the friction part 64 is generated.

In a case of the normal vibration state, a buffer operation due to the damper spring 63 and attenuation due to the slider 62 are achieved.

In a case of the excessive vibration state, a combination attenuation of a buffer operation of the damper spring 63, attenuation of the slider 62, and friction force of the friction part 64 is applied.

That is, in an excessive vibration state exceeding a buffer range of the damper spring 63, the slider 62 pushes and moves the friction part housing 66 to operate the friction part 64.

The transverse damper 70 buffers the horizontal vibration during vibration occurring from the tub 20. The above means that the transverse damper 70 mainly buffers the horizontal vibration but shall not be interpreted that the transverse damper 70 buffers only the horizontal vibration.

In the present embodiment, the transverse damper 70 connects the cabinet 10 to the tub 20.

The transverse dampers 70 are disposed at an upper part and a lower part of the tub 20, respectively.

Further, a plurality of transverse dampers 70 is circumferentially disposed at the tub 20.

In the present embodiment, four transverse dampers 70 are disposed at the same interval at the upper part of the tub 20. In addition, four transverse dampers 70 are disposed at the same interval at the lower part of the tub 20.

In order to assemble the transverse dampers 70, guide pins 80 are disposed at an upper part and a lower part of the cabinet 10, respectively.

For convenience of the description, a reference numeral of an upper transverse damper is defined as 71 and a reference numeral of a lower transverse damper is defined as 72.

The transverse damper 70 may buffer transverse vibration at the same height. When the tub 20 vertically vibrates, the transverse damper 70 may vertically move along the guide pin 80 to buffer the transverse vibration.

Only one guide pin 80 may be disposed. In the present embodiment, the guide pin 80 includes an upper guide pin 81 coupled with the upper transverse damper 71 and a lower guide pin 82 coupled with the lower transverse damper 72.

In the present embodiment, the upper guide pin 81 extends downward from the top cover 16.

In the present embodiment, the lower guide pin 82 extends upward from the cabinet base 12.

A guide stopper 83 is disposed at a bottom end of the upper guide pin 81 and prevents the transverse damper 70 from being separated. A guide stopper 83 is disposed at a top end of the lower guide pin 82 and prevents the transverse damper 70 from being separated.

Unlike the present embodiment, friction parts 64 are disposed at the upper guide pin 81 and the lower guide pin 82, respectively, to suppress separation of the transverse damper 70.

Although only the guide pin 80 is shown for description in the present embodiment, a separate support structure (not shown) may be installed in order to support vibration of the tub 20.

In the present embodiment, the guide pin 80 is coupled with the top cover 16 or the cabinet base 12 to be supported, and is not directly connected with the cabinet body 14.

Unlike the present embodiment, when the cabinet body 14 is a firm structure, the guide pin 80 may be coupled with the cabinet body 14.

The transverse damper 70 includes a first connection member 90 coupled with one of the cabinet 10 or the tub 20; a second connection member 100 inserted into the interior of the first connection member 90 to relatively move, and coupled with the other of the cabinet 10 or the tub 20; and a damper holder 150 coupled with an end of the first connection member 90 and an end of the second connection member 100 and rotated relative to the first connection member 90 or the second connection member 100.

The damper holder 150 is a connection element to connect the first connection member 90 with the guide pin 70.

In the present embodiment, the first connection member 90 is configured in the form of a piston, and the second connection member 100 is configured in the form of a cylinder.

The fluid is filled inside the second connection member 100 used as the cylinder, and provides a damping force during relative motion with the first connection member 90.

The damper holder 150 may be installed in at least one of an end of the first connection member 90 or an end of the second connection member 100, and may be installed at both of them.

In the present embodiment, a damper holder 150 is installed at the second connection member 90 coupled with the guide pin 80.

The damper holder 150 includes a guide hole 151 in which the guide pin 80 is inserted and a holder shaft 152 coupled with the first connection member 90 to be rotated.

The damper holder 150 may vertically move along the guide pin 80.

In this case, the damper holder 150 may be rotated based on the holder shaft 152. The damper holder 150 may be rotated at an angle formed due to relative motion of the transverse damper 70.

The first connection member 90 is formed therein with a holder shaft hole 91 in which the holder shaft 152 is inserted.

The damper holder 150 connects the guide pin 80 and the first connection member 90 to cross each other.

Further, a limiting member 120 for limiting a moving distance of the first connection member 90 may be installed at the second connection member 100. The limiting member 120 is locked to a coupling protrusion 102 which is formed at the second connection member 100. The limiting member 120 is coupled with a side of the second connection member 100 in which the first connection member 90 is inserted.

The piston stopper 120 prevents the first connection member 90 from being separated from the second connection member 100.

The limiting member 120 is formed therein with a coupling hole 122 in which the coupling protrusion 102 is inserted.

Figure 5:
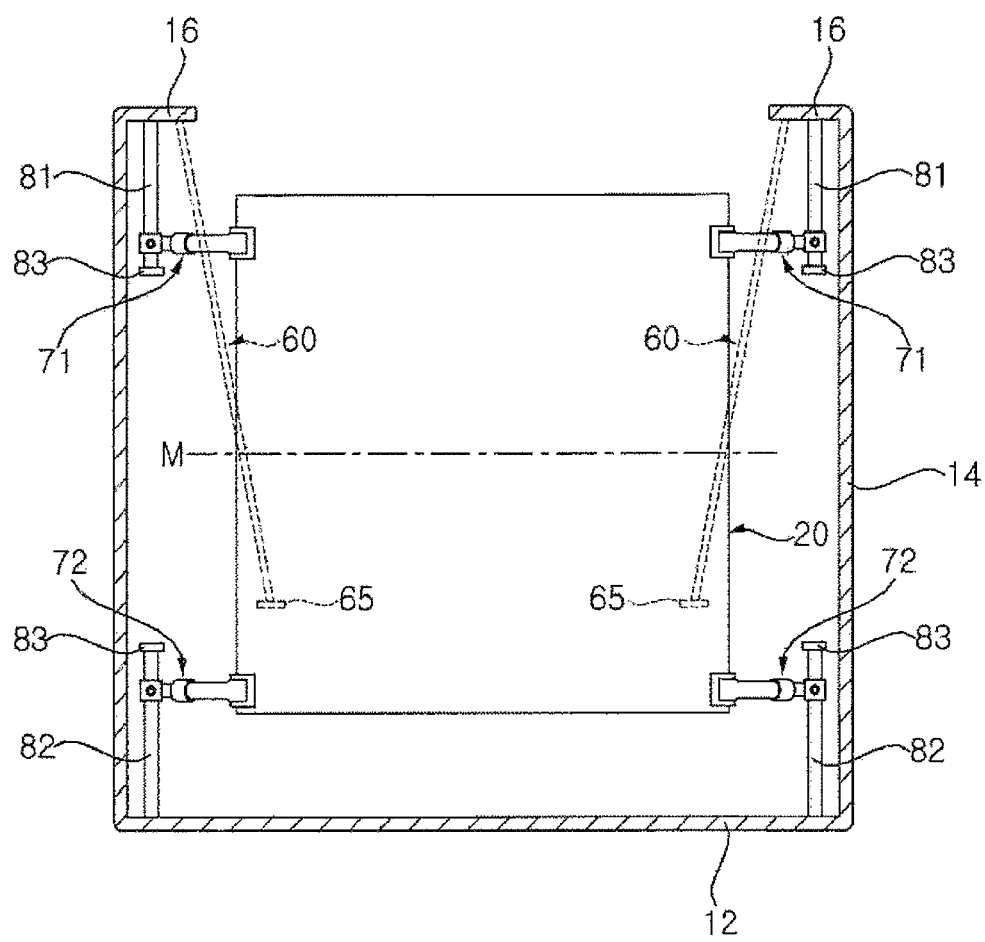
FIG. 5 is a front view schematically illustrating arrangement of a transverse damper in a top load washing machine according to a first embodiment of the present invention.
Figure 6:
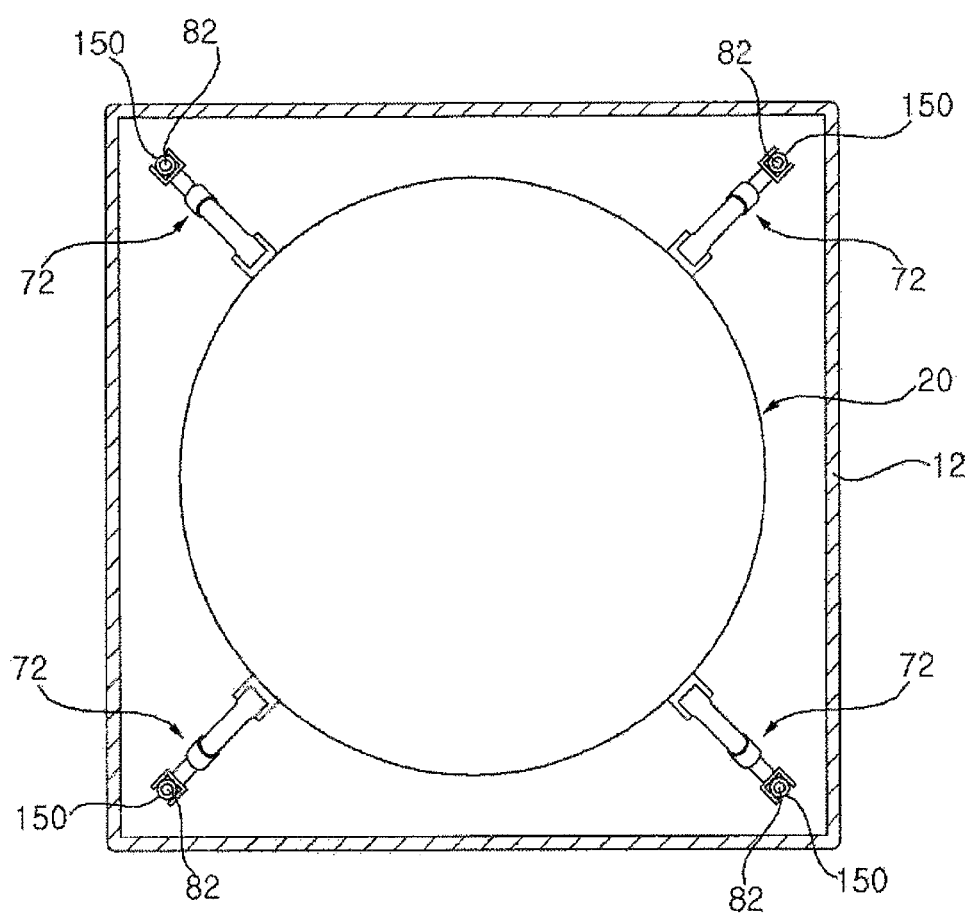
FIG. 6 is a plan view schematically illustrating arrangement of a transverse damper in a top load washing machine according to a first embodiment of the present invention.

FIG. 5 is a front view schematically illustrating arrangement of a transverse damper in a top load washing machine according to a first embodiment of the present invention, and FIG. 6 is a plan view schematically illustrating arrangement of a transverse damper in a top load washing machine according to a first embodiment of the present invention.

The transverse dampers 70 may be installed at an upper part and a lower part based on the slider 62, the supporting end 65, or the damper spring 63. Hereinafter, in embodiments, the upper part or the lower part are distinguished from each other based on the supporting end 65.

When viewed from the top, an inner side of the transverse damper 70 is coupled with the tub and an outer side thereof is coupled with the guide pin 80.

The guide pin 80 vertically extends long.

The transverse damper 70 is coupled with the guide pin 80 to cross each other.

A damper holder 150 is disposed between the transverse damper 70 and the guide pin 80.

When vibration occurs in the tub 20, the transverse damper 70 may be vertically moved along the guide pin 80. More accurately, the first connection member 90 coupled with the damper holder 150 may be vertically moved along the guide pin 80 together with the damper holder 150.

Moreover, when vibration occurs in the tub 20, the first connection member 90 and the second connection member 100 move relative to each other to damp the transverse vibration of t the tub 20. (hereinafter, to damp vibration by the transverse damper is defined as a transverse damping)

The transverse damping may be operated in a state that the transverse damper 70 is fixed to the guide pin 80. The transverse damping may be operated when the transverse damper 70 is moved along the guide pin 80.

When a height of the transverse damper 70 is changed, the damper holder 150 is rotated based on the holder shaft 152 to prevent the guide pin 80 or the transverse damper 70 from being deformed.

In addition, an upper transverse damper 71 may be located above a middle height M of the tub 20, and a lower transverse damper 72 may be located under the middle height M of the tub 20.

When viewed from the top, four upper transverse dampers 71 are disposed around the tub 20 and are disposed at the same interval based on an axis of the tub 20.

Further, four lower transverse dampers 72 are disposed around the tub 20 and are disposed at the same interval based on an axis of the tub 20.

Moreover, in the present embodiment, when viewed from the top, an outer side of the transverse damper 70 is located at an edge of the cabinet 10 and an inner side of the transverse damper 70 is located at a peripheral surface of the tub 20.

Thus, when viewed from the top, a pair of two transverse dampers 70 is located at a straight line.

That is, four upper transverse dampers 71 are disposed toward a drive shaft of the tub 20.

In the present embodiment, the transverse damper 70 is radially disposed at a peripheral surface of the tub 20. The transverse damper 70 is installed perpendicular to a peripheral surface of the tub 20.

In the present embodiment, the shaft center corresponds to the drive shaft.

When viewed from the front, the upper transverse damper 71 and the lower transverse damper 72 are disposed horizontal to the ground.

Figure 7:
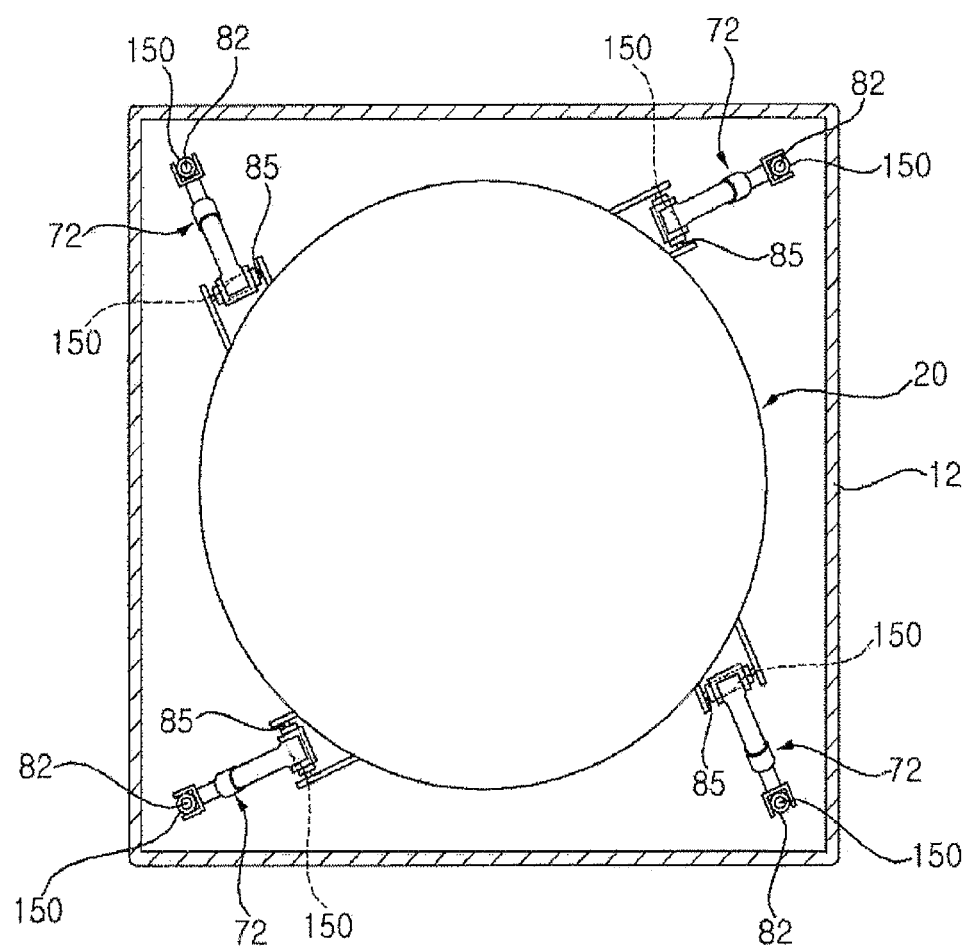
FIG. 7 is a front view schematically illustrating arrangement of a transverse damper in a top load washing machine according to a second embodiment of the present invention.

FIG. 7 is a front view schematically illustrating arrangement of a transverse damper in a top load washing machine according to a second embodiment of the present invention.

Unlike the first embodiment, a top load washing machine according to the present embodiment includes transverse dampers 70 installed to have an acute angle with a peripheral surface of the tub 20 instead of being perpendicular to a peripheral surface of the tub 20.

A tub guide pin 85 may be further installed at a peripheral surface of the tub 20 so that an inner side of the transverse damper 70 may be moved.

The tub guide pin 85 may be horizontally installed.

In the present embodiment, a damper holder 150 is further installed at an end of the second connection member 100, and the damper holder 150 may be horizontally moved along the tub guide pin 85.

When the horizontal vibration occurs in the tub 20, the relative motion may occur at an inner side of the transverse damper 70 to minimize the vibration to be transferred to a direction of the cabinet 10.

In addition, since an inner side of the transverse damper 70 may move relative to the tub 20, it may prevent stress from being concentrated into the inner side of the transverse damper 70 and may prevent damage such as permanent deformation.

Hereinafter, remaining constituent elements are the same as those of the first embodiment, and the detailed description thereof will be omitted.

Figure 8:
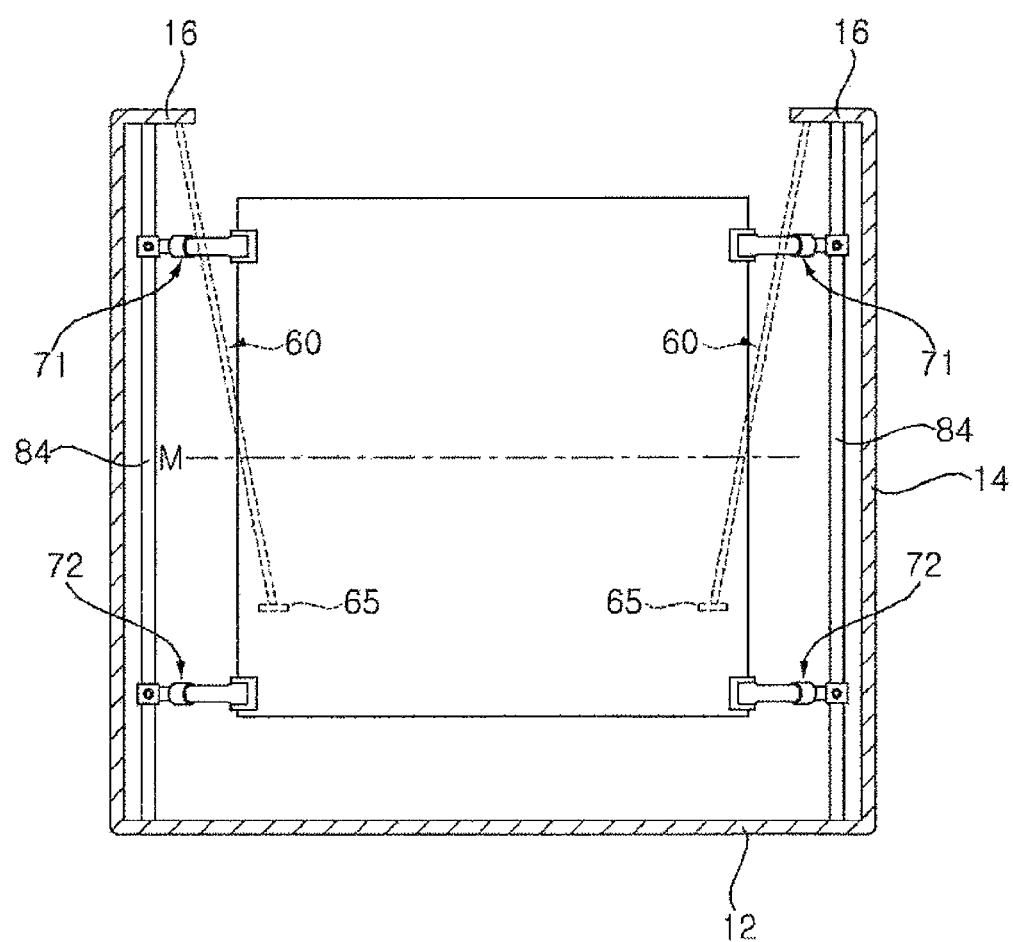
FIG. 8 is a front view schematically illustrating arrangement of a transverse damper in a top load washing machine according to a third embodiment of the present invention.

FIG. 8 is a front view schematically illustrating arrangement of a transverse damper in a top load washing machine according to a third embodiment of the present invention.

In the present embodiment, a top end of each of guide pins 84 is fixed to the top cover 16 and a bottom end of the guide pin 84 is fixed to the cabinet base 12. An outer side of the transverse damper 70 is coupled with the guide pin 84 and an inner side of the transverse damper 70 is coupled with the tub 20.

In particular, at least two transverse dampers 70 are vertically arranged in one guide pin 84. A reference number of an upper transverse damper is defined as 71 and a reference number of a lower transverse damper is defined as 72.

In the present embodiment, an upper transverse damper 71 and a lower transverse damper 72 are installed at one guide pin 84. Since the upper transverse damper 71 and the lower transverse damper 72 are installed at one guide pin 84, the installation number of guide pins 84 may be minimized.

Since the guide pin 84 supports the top cover 16 and the cabinet base 12, structural stiffness is excellent.

When viewed from the top, guide pins 84 are disposed at 4 edges of the cabinet 10, respectively.

As in the present embodiment, when the guide pin 84 is fixed to the top cover 16 and the cabinet base 12, the guide pin 84 may firmly support structural load.

When vibration occurs in the tub 20, since motion of the transverse dampers 70 is the same as that of the first embodiment, a detailed description thereof will be omitted.

Figure 9:
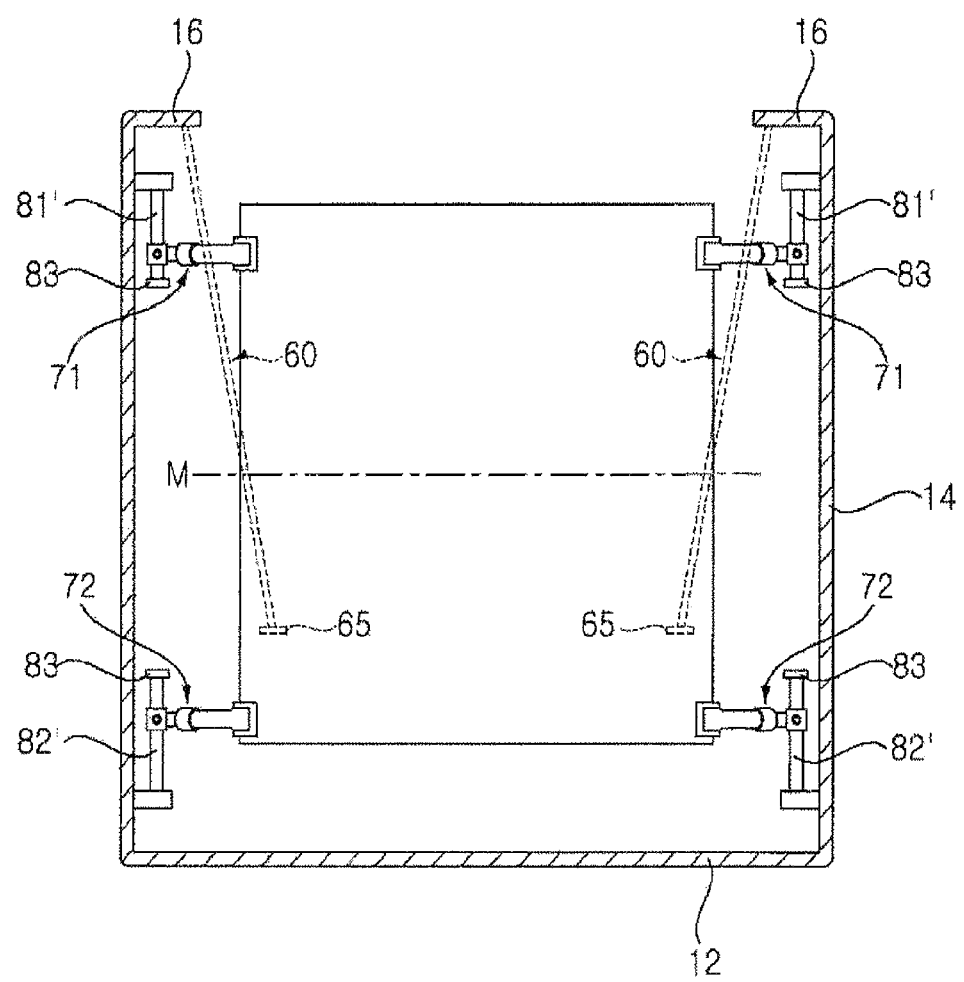
FIG. 9 is a front view schematically illustrating arrangement of a transverse damper in a top load washing machine according to a fourth embodiment of the present invention.

FIG. 9 is a front view schematically illustrating arrangement of a transverse damper in a top load washing machine according to a fourth embodiment of the present invention.

A top load washing machine according to the present embodiment includes guide pins 81' and 82' fixed to a cabinet body 14.

An upper guide pin 81' protrudes inward from the cabinet body 14 and is installed downward. A lower guide pin 82' protrudes inward from the cabinet body 14 and is installed upward.

Unlike the present embodiment, ends of the guide pins 81' and 82' may be installed downward. Unlike the present embodiment, ends of the guide pins 81' and 82' may be installed upward.

When stiffness of the cabinet body 14 is high or the cabinet body 14 is structurally firm, an upper guide pin 81' and a lower guide pin 82' are installed in the cabinet body 14 as in the present embodiment.

Hereinafter, since remaining constituent elements are the same as those of the first embodiment, a detailed description thereof will be omitted.

Figure 10:
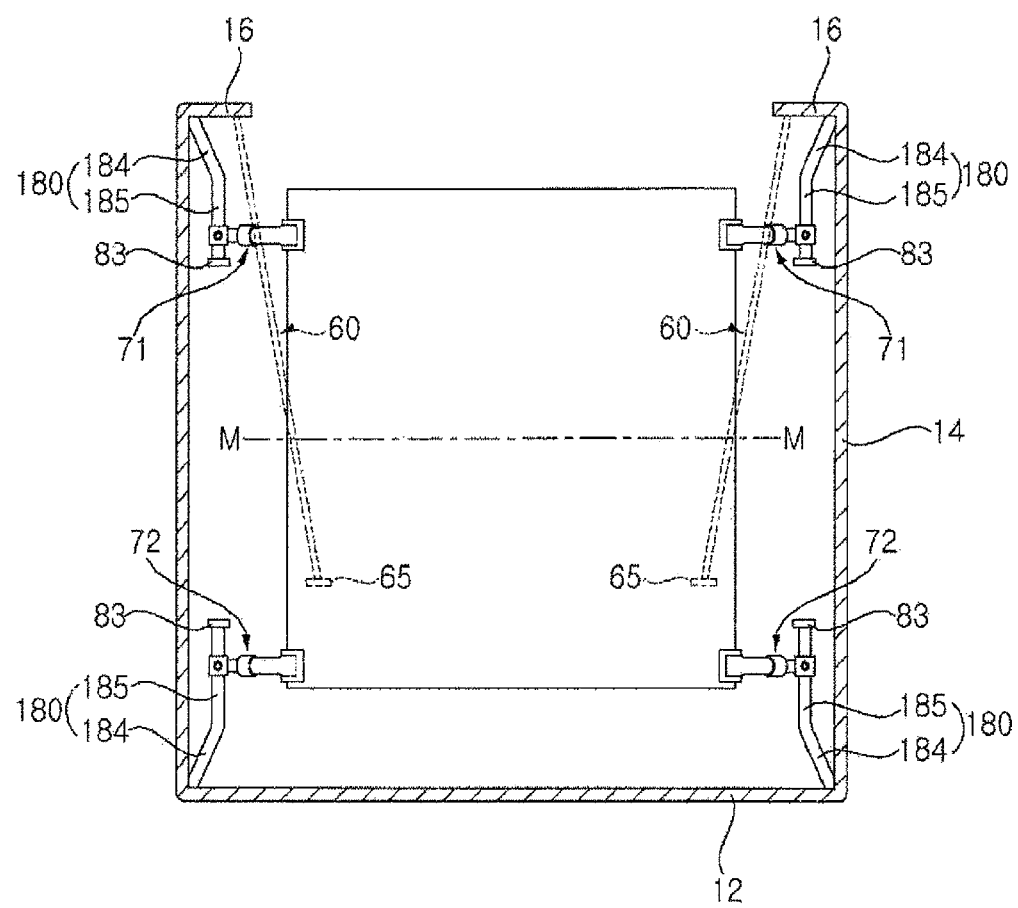
FIG. 10 is a front view schematically illustrating arrangement of a transverse damper in a top load washing machine according to a fifth embodiment of the present invention.

FIG. 10 is a front view schematically illustrating arrangement of a transverse damper in a top load washing machine according to a fifth embodiment of the present invention.

A guide pin 180 according to the present embodiment includes an oblique support part 184 coupled with a cabinet 10 and a guide part 185 coupled with the transverse damper 70 to vertically guide the transverse damper 70.

The oblique support part 184 is fixed to the cabinet 10.

The oblique support part 184 may be fixed to the top cover 16.

The oblique support part 184 may be fixed to the cabinet body 14.

The oblique support part 184 may be fixed to the cabinet base 12.

The oblique support part 184 may be fixed to both of the top cover 16 and the cabinet body 14.

The oblique support part 184 may be fixed to both of the cabinet base 12 and the cabinet body 14.

The oblique support part 184 protrudes inward from the cabinet 10 and is inclined with respect to a horizontal direction.

The oblique support part 184 may be inclined toward the tub 20.

The oblique support part 184 may be inclined toward the transverse damp 70.

The oblique support part 184 may efficiently support the horizontal vibration of the tub 20.

Hereinafter, since remaining constituent elements are the same as those of the first embodiment, a detailed description thereof will be omitted.

Figure 11:
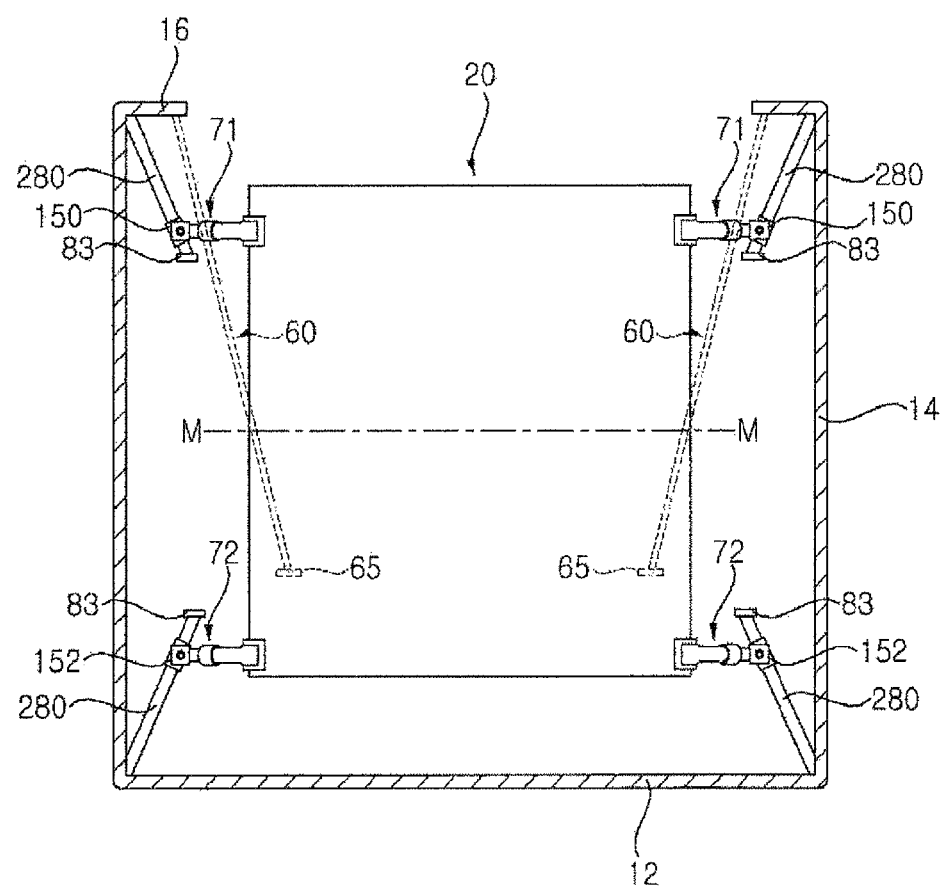
FIG. 11 is a front view schematically illustrating arrangement of a transverse damper in a top load washing machine according to a sixth embodiment of the present invention.

FIG. 11 is a front view schematically illustrating arrangement of a transverse damper in a top load washing machine according to a sixth embodiment of the present invention.

A guide pin 280 according to the present embodiment is disposed obliquely with respect to a vertical side or a horizontal side of the tub 20. An outer side of the transverse damper 70 may be obliquely moved along the guide pin 280.

The guide pin 280 may be inclined toward the tub 20.

The guide pin 280 may be inclined toward the transverse damper 70.

A damper holder 150 of the transverse damper 70 according to the present embodiment includes a holder shaft 152 which is inclined. If vibration occurs in the tub 20, the damper holder 150 may be diagonally moved along the guide pin 280 which is inclined.

The oblique guide pin 280 may provide a support force with respect to the horizontal vibration or the vertical vibration.

Hereinafter, since remaining constituent elements are the same as those of the first embodiment, a detailed description thereof will be omitted.

Figure 12:
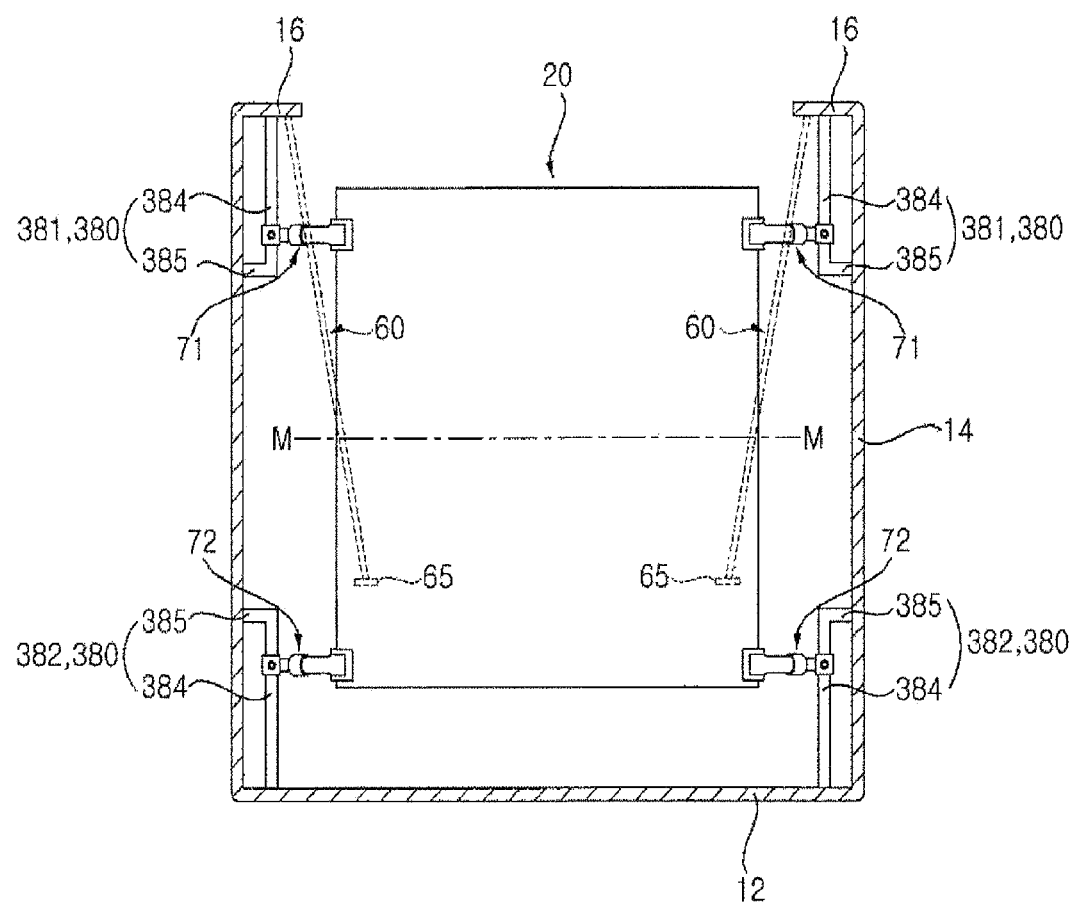
FIG. 12 is a front view schematically illustrating arrangement of a transverse damper in a top load washing machine according to a seventh embodiment of the present invention.

FIG. 12 is a front view schematically illustrating arrangement of a transverse damper in a top load washing machine according to a seventh embodiment of the present invention.

One end and an opposite end of a guide pin 380 according to the present embodiment are fixed to a cabinet 10.

One end of an upper guide pin 381 is fixed to a cabinet body 14 and an opposite end of the upper guide pin 381 is fixed to a top cover 16. One end of a lower guide pin 382 is fixed to the cabinet body 14 and an opposite end of the lower guide pin 382 is fixed to a cabinet base 12.

The upper guide pin 381 includes a guide part 384 configured to vertically guide the upper transverse damper 71 and a transverse support part 385 configured to fix the guide part 384 to the cabinet body 14.

The lower guide pin 283 includes a guide part 384 configured to vertically guide the lower transverse damper 72 and a transverse support part 385 configured to fix the guide part 384 to the cabinet body 14.

Since both ends of the guide pin 380 according to the present embodiment are fixed, flexural deformation may be minimized. The above may minimize to transfer vibration to a cabinet by minimizing deformation of the guide pin 380.

Furthermore, the transverse support part 385 may maximized a support force with respect to the horizontal vibration.

Hereinafter, since remaining constituent elements are the same as those of the first embodiment, a detailed description thereof will be omitted.

Figure 13:
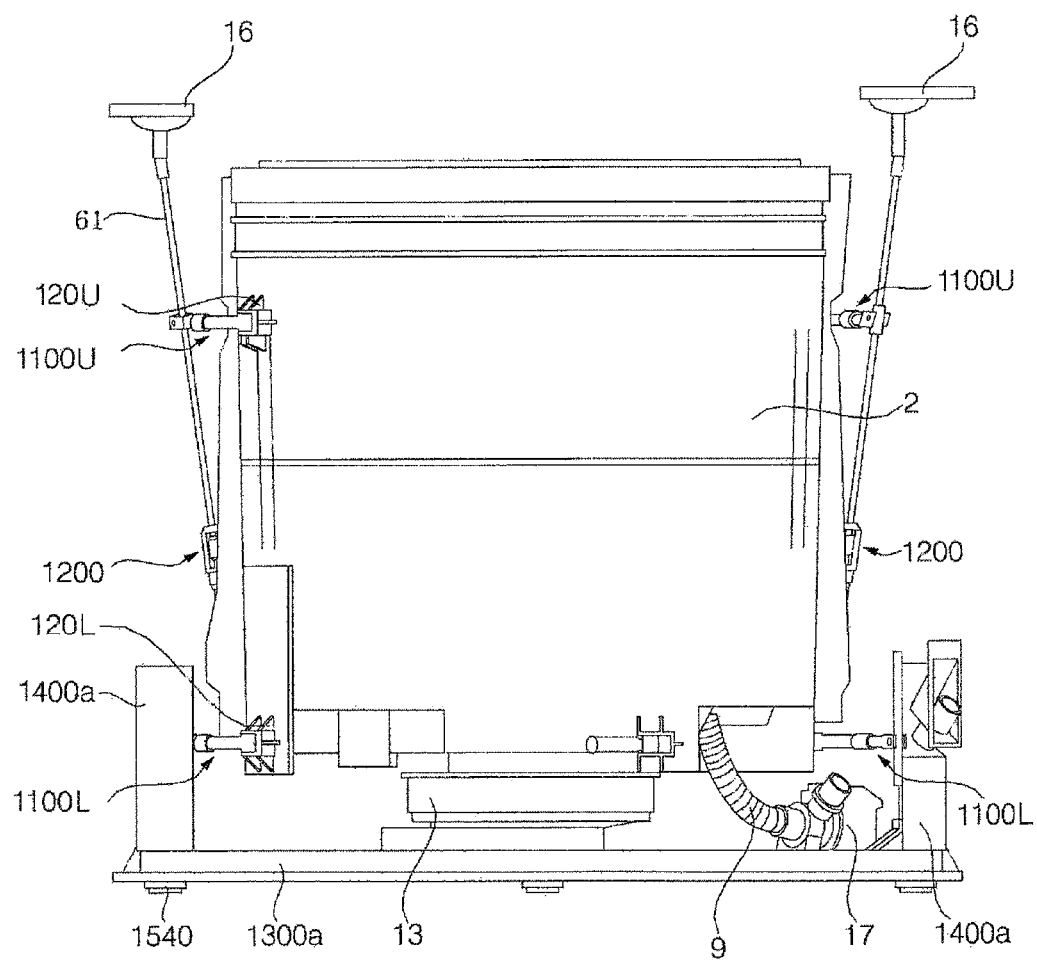
FIG. 13 is a front view illustrating an inside of a cabinet in a washing machine according to an eighth embodiment of the present invention.
Figure 14:
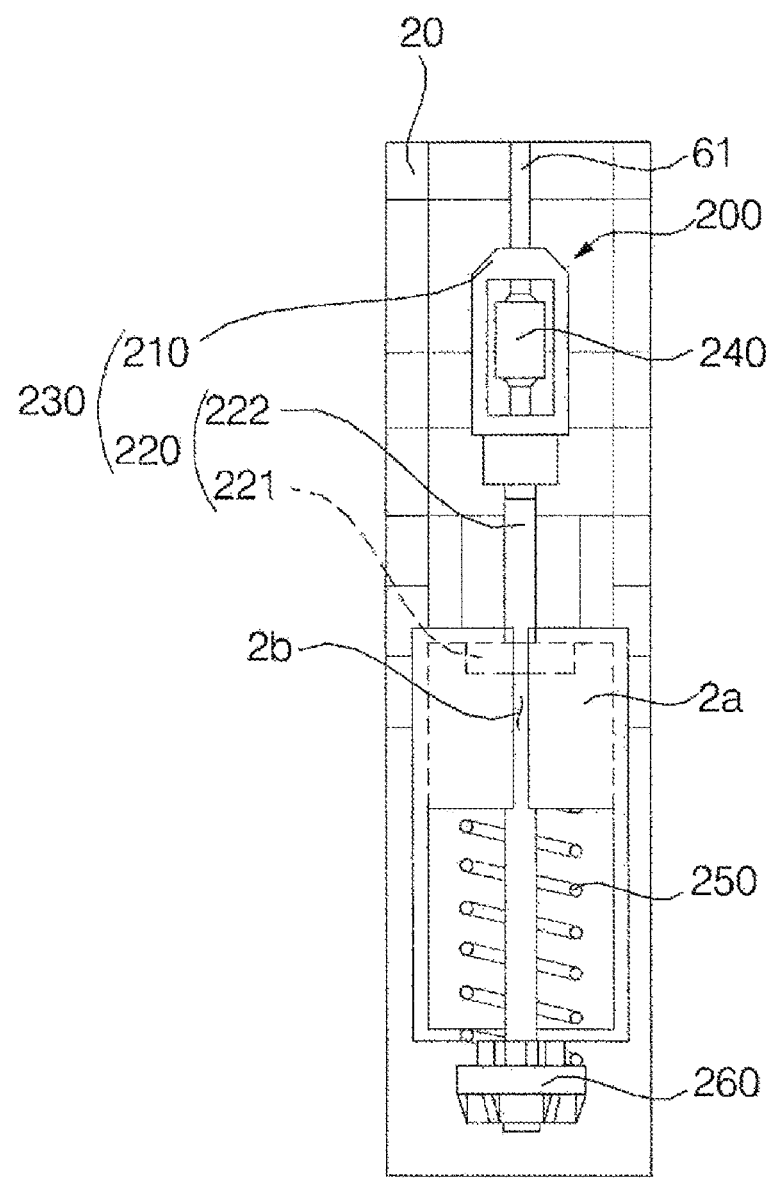
FIG. 14 is a front view illustrating a longitudinal damper shown in FIG. 13.
Figure 15:
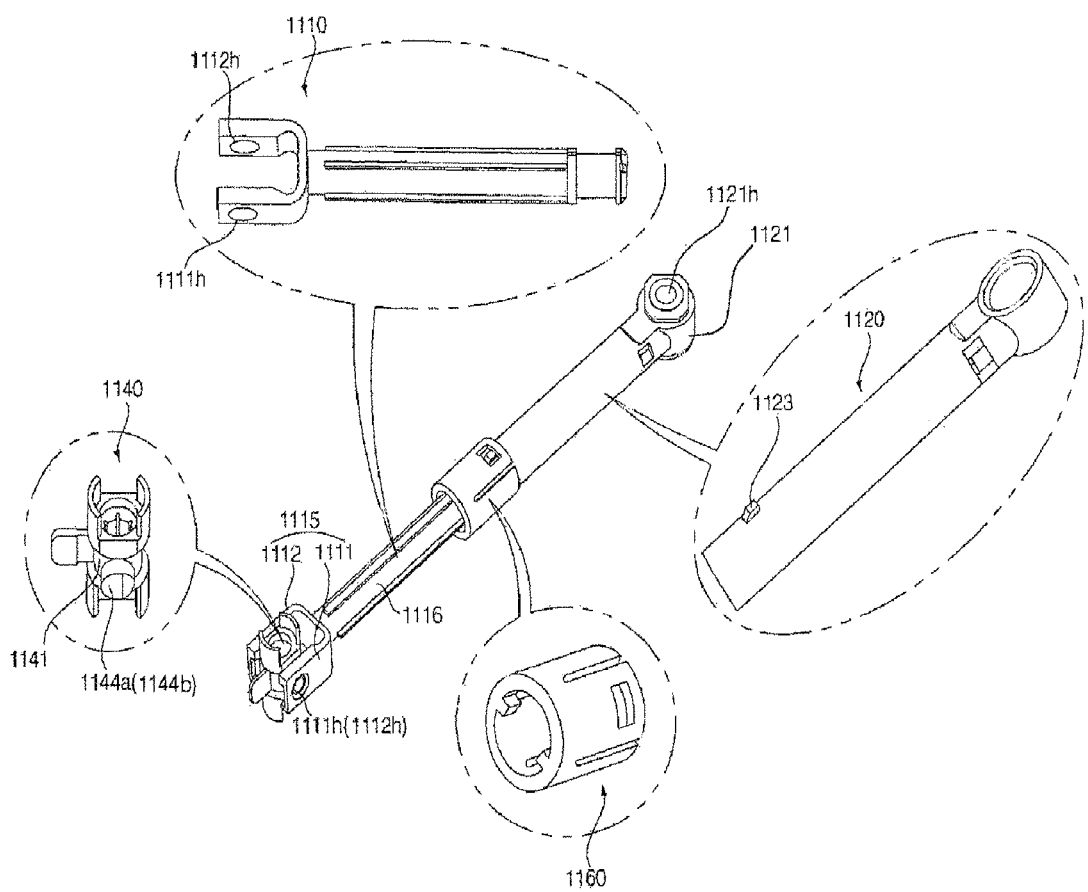
FIG. 15 is an exploded perspective view illustrating a transverse damper shown in FIG. 13.
Figure 16:
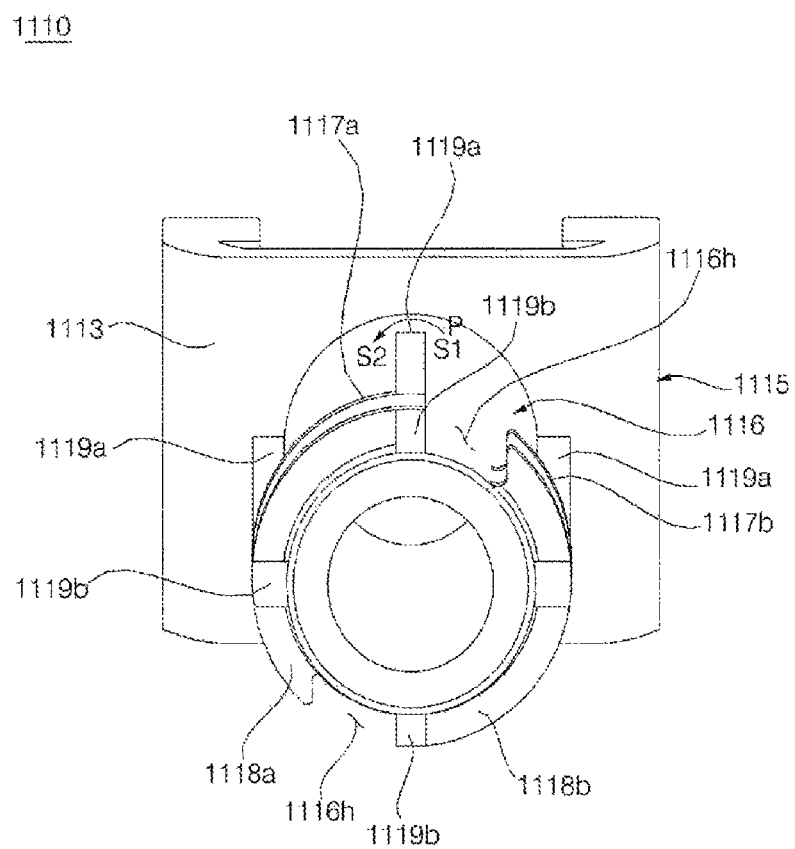
FIG. 16 is a perspective view illustrating a first connection member shown in FIG. 15 in a longitudinal direction.
Figure 17:
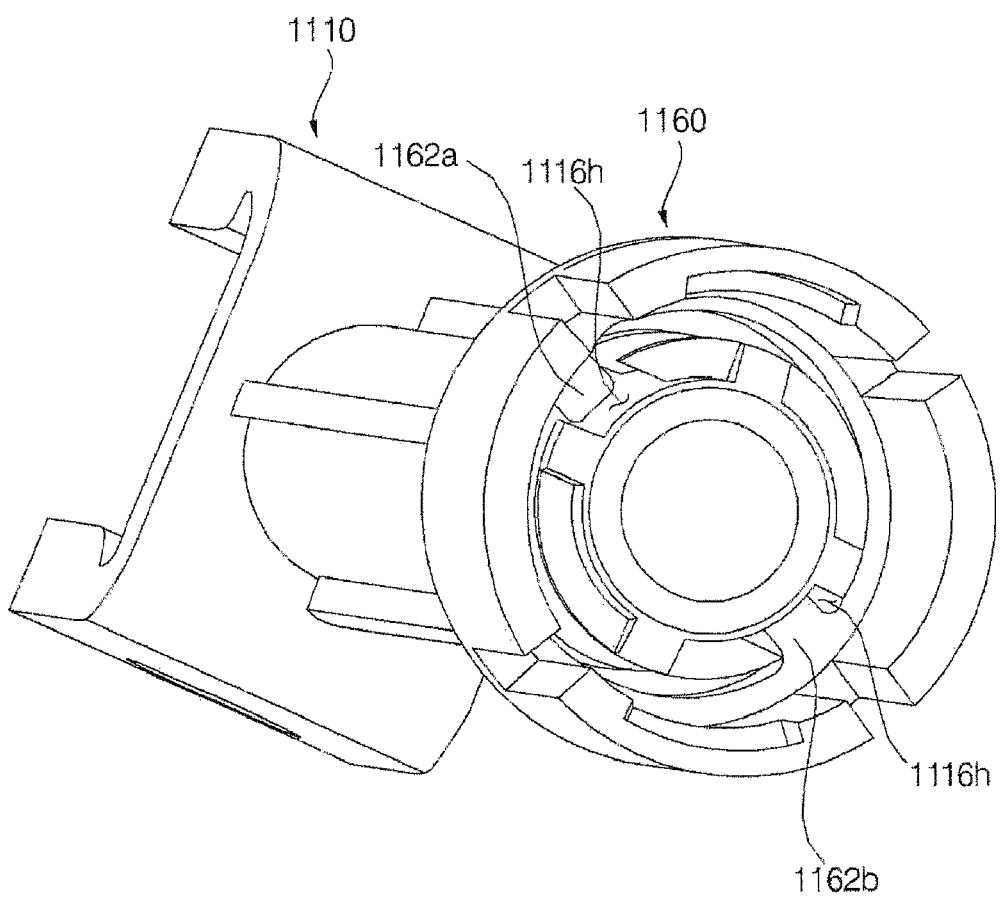
FIG. 17 is a perspective view illustrating an assembly structure of the first connection member and a limiting member shown in FIG. 15.
Figure 18:
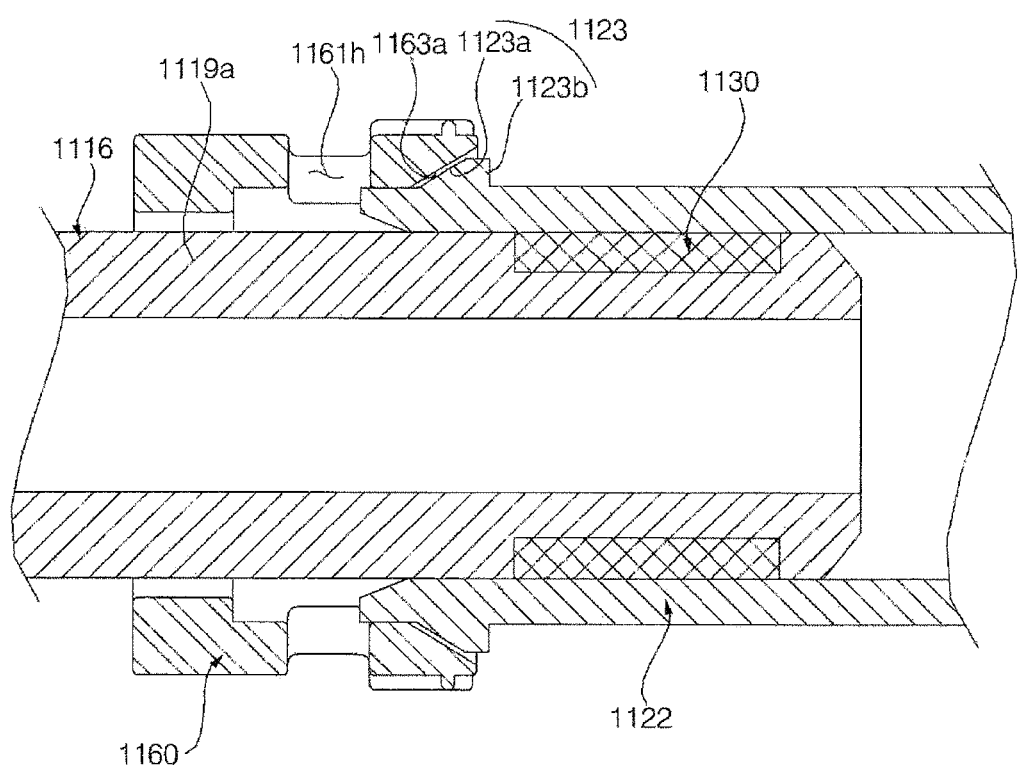
FIG. 18 is a sectional view illustrating a coupling structure between the limiting member and a cylinder shown in FIG. 15.
Figure 19:
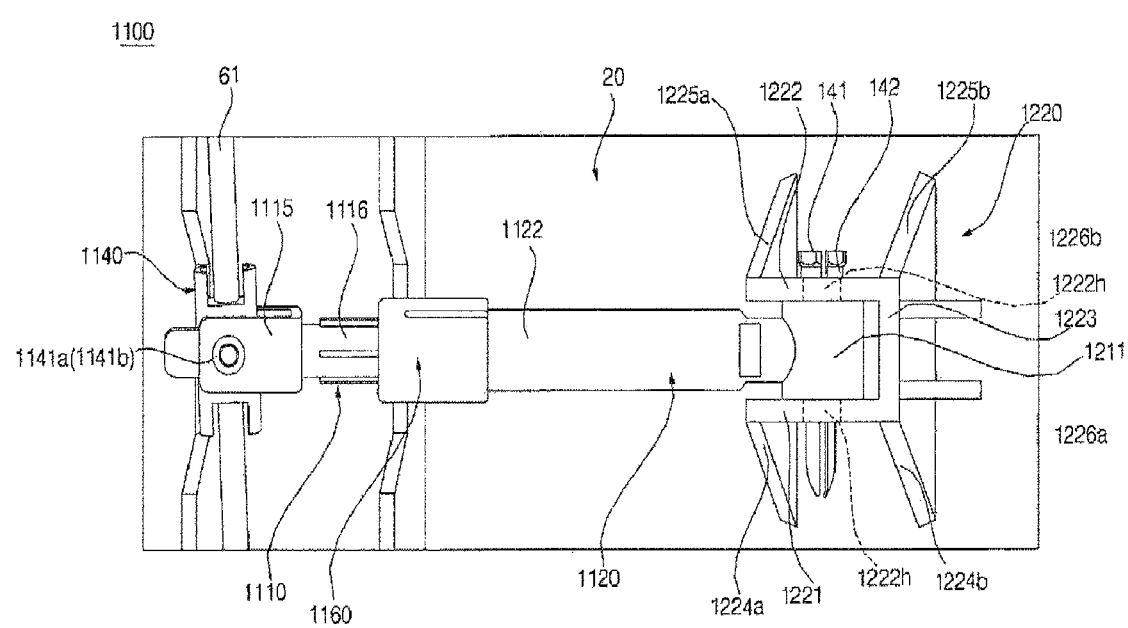
FIG. 19 is a front view illustrating an upper transverse damper shown in FIG. 13.
Figure 20:
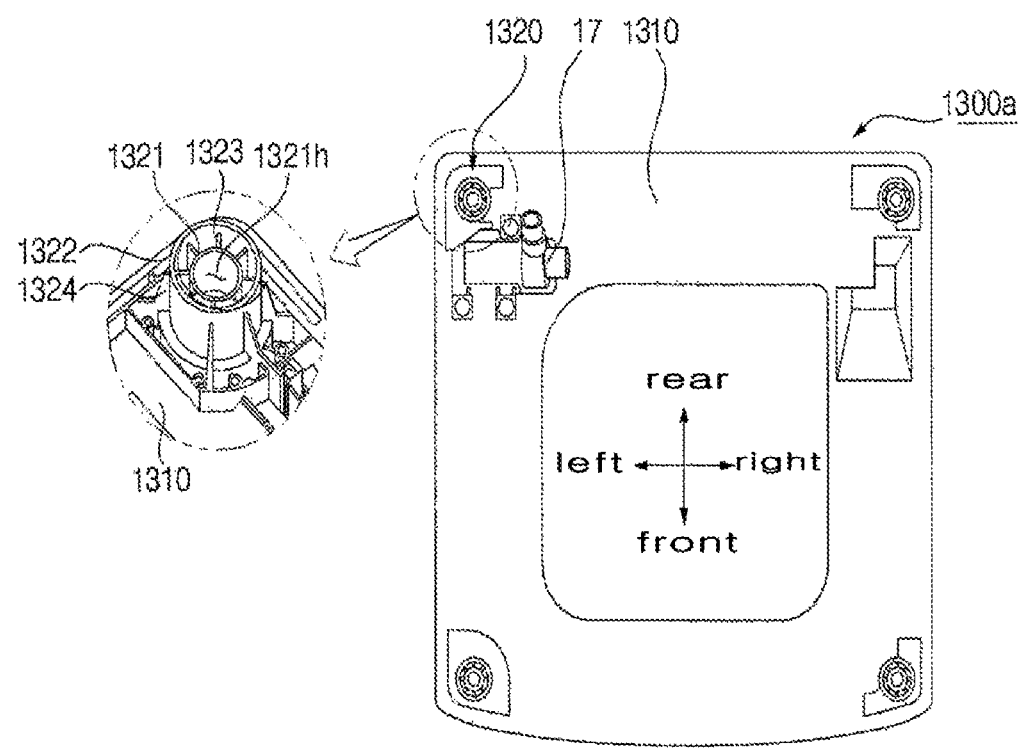
FIG. 20 shows a base of FIG. 13.
Figure 21:
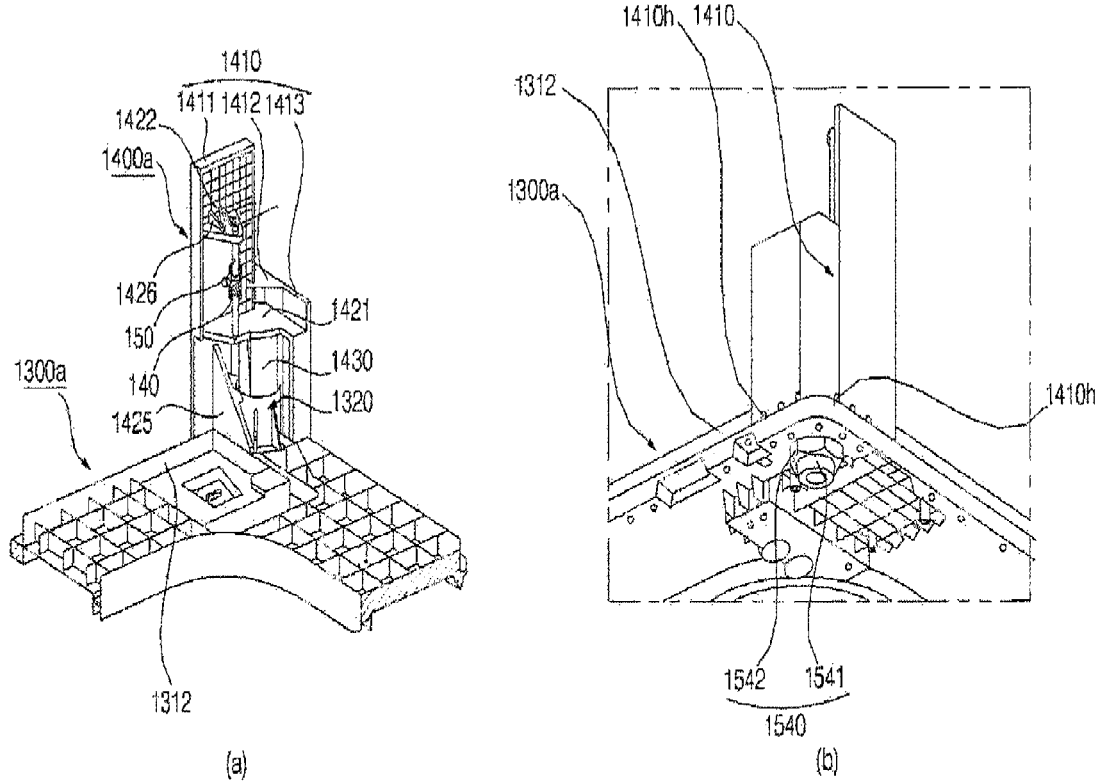
FIG. 21 shows an assembly sate between the base and a pin support of FIG. 20 at various angles.

FIG. 13 is a front view illustrating an inside of a cabinet in a washing machine according to an eighth embodiment of the present invention, FIG. 14 is a front view illustrating a longitudinal damper shown in FIG. 13, FIG. 15 is an exploded perspective view illustrating a transverse damper shown in FIG. 13, FIG. 16 is a perspective view illustrating a first connection member shown in FIG. 15 in a longitudinal direction, FIG. 17 is a perspective view illustrating an assembly structure of the first connection member and a limiting member shown in FIG. 15, FIG. 18 is a sectional view illustrating a coupling structure between the limiting member and a cylinder shown in FIG. 15, FIG. 19 is a front view illustrating an upper transverse damper shown in FIG. 13, FIG. 20 shows a base of FIG. 13, and FIG. 21 shows an assembly sate between the base and a pin support of FIG. 20 at various angles.

Referring to FIG. 13, a washing machine according to an embodiment of the present invention may include a cabinet 10 configured to provide a predetermined space inward. The cabinet 10 provides a predetermined space to receive various constituent elements inward and may include a base 1300a configured to support the cabinet 10.

A tub 20 receiving laundry water is hung by a support rod in the cabinet 10 and a drum 30 is rotatably provided in the drum 20. A pulsator 4 may be rotatably provided in the drum 30.

At least one of the drum 30 or a pulsator (not shown) is rotated by a driving part 50 and vibration of the tub 20 may occur during the above procedure. The tub 20 may vibrate horizontally as well as vertically. A longitudinal damper 1200 or a transverse damper 1100 may be provided so that vibration of the tub 20 may be efficiently attenuated.

A plurality of transverse dampers 1100 may be arranged at the same height. Further, a plurality of transverse dampers 1100 may be arranged at different heights.

A damper disposed at an upper side of the transverse dampers 1100 is defined as an upper transverse damper 1100U, and a damper disposed at a lower side of the transverse dampers 1100 is defined as a lower transverse damper 1100L.

The upper transverse damper 11000 and the lower transverse damper 1100L may substantially have the same structure.

Four upper transverse dampers 11000 are disposed at an upper side of the tub 20, and the upper transverse dampers 1100U may be symmetrically disposed based on the tub 20, respectively.

Four lower transverse dampers 1100L are disposed at a lower side of the tub 20, and the lower transverse dampers 1100L may be symmetrically disposed based on the tub 20, respectively.

The longitudinal damper 1200 is installed in a support rod 61, and connects the support rod 61 to the tub 20. That is, the tub 20 is connected with the support rod 61 by the longitudinal damper 1200 so that the tub 20 is hung in the cabinet 10.

While the tub 20 is moved along the support rod 61, the longitudinal damper 1200 is operated to attenuate vibration of the tub 20.

Four support rods 61 may be provided corresponding to four edges of the cabinet 10 and a longitudinal damper 1200 may be provided in each support rod 61.

However, a configuration to connect the tub 20 to the support rod 61 is not always limited to the longitudinal damper 1200 according to an embodiment. For example, the support rod 61 may be connected to the tub 20 by a suspension (not shown). The support rod 61 may be connected to the tub 20 by various forms of a suspension (or damper) which is known.

Reference numeral 17 represents a drainage pump.

Referring to FIG. 14, a longitudinal damper 1200 includes a slider 230 moved integrally with a tub 20; a supporting end 260 provided at an end of the support rod 61; a spring 250 including a bottom end elastically supported by the supporting end 260 and a top end elastically supporting the slider 230; and a friction part 240 pushed and moved by the slider 230 during vibration of the tub 20 and forming a friction force with the support rod 61 during movement.

The slider 230 forms a predetermined space in which the friction part 240 is received inward. A vertical length of the space is greater than a vertical length of the friction part 240. Accordingly, the friction part 240 is not always moved integrally with the slider 230 but is moved integrally with the slider 230 only when a displacement of the slider 230 is greater than a predetermined level.

That is, when a vertical vibration width of the tub 20 is greater than the predetermined level, the slider 230 makes contact with the friction part 240. In this case, the slider 230 and the friction part 240 are simultaneously moved.

When the vertical vibration width of the tub 20 is less than the predetermined level, only buffering by the spring 250 or friction attenuation by the slider 230 is achieved without a friction operation by the friction part 240.

When the vertical vibration width of the tub 20 is equal to or greater than the predetermined level, vibration attenuation including friction by the friction part 240 may be achieved.

Accordingly, when vibration of the tub 20 is relatively small such as a normal vibration state (a case where laundry is uniformly distributed in the drum 30), the slider 230 may be relatively easily moved along the support rod 61.

In an excessive vibration state (for example, high speed drainage is achieved in a state that laundry is uniformly distributed in the drum 30), vibration may actively attenuated through a friction force by the friction part 240.

The slider 230 may include a tub support part 220 configured to support a longitudinal damper locking part 2a formed at the tub 20 and a friction part receiving part 210 forming a space in which the friction part 240 is received, which are separately formed.

In this case, the tub support part 220 may be elastically supported by the spring 250 and the friction part receiving part 210 may be separately coupled with a upper part of the tub support part 220.

The tub support part 220 may include a cap portion 221 elastically supported by the spring 250 and a neck portion 222 extending upward from the cap portion 221 and a support rod 61 passes through an inner side of the neck portion 222.

The longitudinal damper locking part 2a protrudes from a peripheral region of the tub 20 and is mounted on the cap portion 221.

The longitudinal damper locking part 2a is formed therein with an opening portion which is open upward, and may be exposed upward from the neck portion 222 through the opening portion. The cap portion 221 does not pass through the opening portion and interferes with the longitudinal damper locking part 2a. Upon interference between the cap portion 221 and the longitudinal damper locking part 2a, the cap portion 221 and the longitudinal damper locking part 2a are integrally displaced due to a load acting from the tub 20.

The longitudinal damper locking part 2a includes a slit 2b which is open in a transverse direction and extends in a longitudinal direction. A transverse opening width of the slit 2b is preferably determined to allow passing of the support rod 61 so that the longitudinal damper 1200 may be easily assembled, and the neck portion 222 cannot be passed through so that the longitudinal damper 1200 in an assembled state is not separated and deviated from the longitudinal damper locking part 2a.

The transverse damper 1100 may include a first connection member 1110 and a second connection member 1120 to generate displacement with respect to each other when vibration of the tub 20 occurs.

In the present embodiment, the upper transverse damper 1100U connects the support rod 61 to the tub 20. In the present embodiment, the lower transverse damper 1100L connects the guide pin 150 to the tub 20.

A first connection member 1110 of the upper transverse damper 11000 is movably installed along a predetermined support member (support rod 61) which is located at an outer side of the tub 20.

A first connection member 1110 of the lower transverse damper 1100L is movably installed along a predetermined support member (guide pin 150 of FIG. 21) which is located at an outer side of the tub 20.

The guide pin 150 is functionally the same as a guide pin 70 of the first embodiment.

The second connection member 1120 is connected to the tub 20 and is moved integrally with the tub 20 during vibration. The second connection member 1120 is coupled with the first connection member 1110, and may perform relative motion while being assembled with the first connection member 1110.

In this case, in the present embodiment, relative displacement between the first connection member 1110 and the second connection member 1120 is a horizontal moving distance of the tub 20.

One of the first connection member 1110 and the second connection member 1120 may generate a friction force (particularly kinetic friction) with the other thereof. A friction element 1130 may be disposed between the first connection member 1110 and the second connection member 1120.

When the second connection member 1120 is moved, a friction force is generated through relative motion between the friction element 1130 and a relative thing. During the above procedure, the vibration energy is attenuated due to friction.

Meanwhile, the first connection member 1110 may be directly connected with the support rod 61 or the guide pin 150. In the present embodiment, the first connection member 1110 may be connected with the support rod 61 or the guide pin 150 through a damper holder 1140 being a connection element as in the first embodiment.

The connection element is movably coupled along the support rod 61 or the guide pin 150. The first connection member 1110 may be rotatably coupled with the damper holder 1140 being the connection element. It is preferred that the first connection member 1110 is rotatably coupled with the damper holder 1140 in a vertical direction.

Hereinafter, a transverse damper 1100 will be described in detail with reference to FIG. 15 to FIG. 19.

The transverse damper 1100 includes a first connection member 1110 and a second connection member 1120.

The first connection member 1110 is movably connected along a predetermined support member (support rod 61 or guide pin 150) which is located at an outer side of the tub 20.

The second connection member 1120 is connected to the tub 20. In this case, the support member corresponds to the support rod 61 to install the upper transverse damper 1100U. The support member corresponds to the guide pin 150 to install the lower transverse damper 1100L.

One of the first connection member 1110 and the second connection member 1120 may include a cylinder and the other thereof may include a piston which is inserted into the cylinder.

In the present embodiment, the first connection member 1110 includes a piston 1116, and the second connection member 1120 includes a cylinder 1122.

The transverse damper 1100 may include a friction element which is included in at least one of the cylinder 1122 or the piston 1116 to form a friction force with the other thereof. The vibration energy of the tub 20 is removed by friction of the friction element 1130.

In the present embodiment, the friction element 1130 is disposed at the piston 1116, and rubs an inner circumferential surface of the cylinder 1122 during a moving procedure of the piston 1116. Unlike the present embodiment, the friction element 1130 may be disposed at the cylinder 1122.

A transverse damper 1100 may further include a damper holder 1140 movably moved along the support member (support rod 61 or guide pin 150).

The damper holder 1140 is assembled with the first connection member 1110, and the damper holder 1140 may be rotated relative to the first connection member 1110. The first connection member 1110 may be rotatably installed vertically based on a substantially horizontal axis.

The first connection member 1110 may further include a damper holder connector 1115 which is rotatably connected to the damper holder 1140. The piston 1116 may be integrally formed with the damper holder connector 1115. The piston 1116 may extend from the damper holder connector 1115.

The second connection member 1120 may further include a tub connector 1121 which is rotatably connected to the tub 20 and a cylinder 1122 extending from the tub connector 1121.

Unlike the present embodiment, a piston may extend from the tub connector 1121 and a cylinder may extend from the damper holder connector 1115.

The damper holder 1140 may include a damper holder body part 1141 formed therein with a guide hole 1141a. The damper holder body part 1141 is rotatably coupled with the damper holder connector 1115.

A support rod 61 or a guide pin 150 are installed through the guide hole 1141a.

Rotation shafts 1144a and 1144b may be formed at one of the damper holder 1140 and the damper holder connector 1115, and holder shaft holes 1111h and 1112h in which the rotation shafts 1144a and 1144b are inserted may be formed in the other thereof.

The present embodiment has illustrated that a pair of rotation shafts 1144a and 1144b protrude from the damper holder body part 1141 in both directions, and the damper holder connector 1115 is formed therein with a pair of holder shaft holes 1111h and 1112h in which the pair of rotation shafts 1144a and 1144b are inserted.

In detail, the damper holder connector 1115 may include a pair of legs 1111 and 1112, and a leg connector 113 extending from the piston 1116 to connect the pair of legs 1111 and 1112 to each other.

Holder shaft holes 1111h and 1112h are formed in the legs 1111 and 1112, respectively.

The transverse damper 1100 may further include a liming member 1160 configured to limit displacement between a cylinder 1122 and a piston 1116.

The limiting member 1160 may be fixed to the cylinder 1122. A coupling protrusion 1123 may protrude from an outer peripheral surface of the cylinder 1122. A coupling protrusion lock member 1161h locked with the coupling protrusion 1123 may be formed at the limiting member 1160.

The coupling protrusion 1123 includes a first inclined surface 1123a and a lock jaw 1123b.

A height of the inclined surface 1123a is gradually lowered toward a moving direction upon installation. A height of the first inclined surface 1123a is gradually lowered toward the coupling protrusion lock member 1161h.

When the coupling protrusion 1123 is perfectly inserted into the coupling protrusion lock member 1161h, the lock jaw 1123b is locked with the coupling protrusion lock member 1161h.

The lock jaw 1123b is formed substantially perpendicular to an outer peripheral surface of the cylinder 1122. By mutual locking between the lock jaw 1123b and the coupling protrusion lock member 1161h, the limiting member 1160 and the cylinder 1123 maintain a coupled state.

A second inclined surface 1163a making contact with the first inclined surface 1123a may be formed in one end of the limiting member 1160. Since the first inclined surface 1123a and the second inclined surface 1163a have an inclined structure, when the coupling protrusion 1123 is moved, the first inclined surface 1123a and the second inclined surface 1163a may minimize interference.

The first inclined surface 1123a and the second inclined surface 1163a may prevent the coupling protrusion 1123 or the limiting member 1160 from being damaged due to stress concentration during an assembling procedure of the limiting member 1160.

When a moving displacement of the piston 1116 becomes a predetermined level, the limiting member 1160 interferes with the piston 1116 to limit motion of the piston 1116. The limiting member 1160 may include at least one locking protrusion 1162a and 1162b to limit motion.

Referring to FIG. 16, at least one of a first transverse rib 1117a or a second transverse rib 1118a may be formed at an outer peripheral surface of a piston 1116. The first transverse rib 1117a and the second transverse rib 1118a extend in a transverse direction with respect to a longitudinal direction of the piston 1116.

The first transverse rib 1117a and the second transverse rib 1118a may protrude to an outer side in a radial direction with respect to an axial direction of the piston 1116.

A friction element 1130 may be placed between the first transverse rib 1117a and the second transverse rib 1118a. The first transverse rib 1117a and the second transverse rib 1118a are spaced apart from each other so that the friction element 1130 may be installed.

The friction element 1130 is formed by a flexible material in the form of a sheet. The friction element 1130 surrounds an outer side of the piston 1116.

Meanwhile, the first transverse rib 1117a and the second transverse rib 1118a are formed at a partial section of an outer peripheral surface of the piston 1116. The reason for this is to pass through the locking protrusions 1162a and 1162b when the limiting member 1160 is inserted into the piston 1116.

A longitudinal passage 1116h is formed through the first transverse rib 1117a and the second transverse rib 1118a. The locking protrusions 1162a and 1162b pass through the longitudinal passage 1116h. When the limiting member 1160 is inserted through an end of the piston 1116, the locking protrusions 1162a and 1162b sequentially pass through the second transverse rib 1118a and the first transverse rib 1117a. In this case, the locking protrusions 1162a and 1162b pass through the longitudinal passage 1116h.

A plurality of first transverse ribs 1117a and 1117b may be circumferentially formed at an outer peripheral surface of the piston 1116. A longitudinal passage 1116h is formed between the first transverse ribs 1117a and 1117b so that locking protrusions 1162a and 1162b of the limiting member 1160 pass through the longitudinal passage 1116h.

Adjacent first transverse ribs 1117a and 1117b are spaced apart from each other while interposing the longitudinal passage 1116h therebetween.

In particular, since the locking protrusions 1162a and 1162b of the limiting member 1160 installed at the piston 1116 interfere with each other, the first transverse ribs 1117a and 1117b may prevent the limiting member 1160 from being separated from the piston 1116.

Hereinafter, the first transverse ribs 1117a and 1117b refer to a separation prevention rib.

Similarly, a plurality of second transverse ribs 1118a and 1118b may be circumferentially formed at an outer peripheral surface of the piston 1116. Likewise, a longitudinal passage 1116h is formed between the second transverse ribs 1118a and 1118b so that locking protrusions 1162a and 1162b of the limiting member 1160 pass through the longitudinal passage 1116h.

A longitudinal passage 1116h is formed between adjacent second transverse ribs 1118a and 1118b.

When the limiting member 1160 is inserted into the piston 1116, the locking protrusions 1162a and 1162b sequentially pass through a longitudinal passage 1116h between the second transverse ribs 1118a and 1118b and a longitudinal passage 1116h between the first transverse ribs 1117a and 1117b.

That is, the longitudinal passage 1116h between the second transverse ribs 1118a and 1118b is an entrance in which the locking protrusions 1162a and 1162b. The longitudinal passage 1116h between the first transverse ribs 1117a and 1117b is an exit in which the locking protrusions 1162a and 1162b.

Hereinafter, the longitudinal passage 111 is defined as a passage including one end being an entrance and an opposite end being an exit.

A plurality of longitudinal ribs 1119a and 1119b may protrude to an outer side of the piston 1116. The longitudinal ribs 1119a and 1119b may be formed in a longitudinal direction of the piston 1116.

The longitudinal ribs 1119a and 1119b may extend to the leg connector 1113 from the separation prevention ribs 1117a and 1117b.

In particular, a gap is formed between the longitudinal ribs 1119a and 1119b and the leg connector 1113 so that the locking protrusions 1162a and 1162b circumferentially pass through the gap.

Longitudinal ribs 1119a and 1119b extends to a longitudinal direction of the piston 1116. The longitudinal ribs 1119a and 1119b do not extend from a section between the separation prevention ribs 1117a and 1117b and the leg connector 1113 but extend from a partial section thereof so that the locking protrusions 1162a and 1162b may be circumferentially passed.

The limiting member 1160 and the first connection member 1110 are assembled in a following order.

First, after the locking protrusions 1162a and 1162b of the limiting member 1160 pass through the longitudinal passage 1116h, the locking protrusions 1162a and 1162b are located at a first area S1 shown in FIG. 16.

Next, the locking protrusions 1162a and 1162b of the limiting member 1160 are moved along a path P of FIG. 16 and are rotated, and are located at a second area S2.

Next, the limiting member 1160 is assembled by pulling the limiting member 1160 in a longitudinal direction. When the limiting member 1160 is assembled, since the locking protrusions 1162a and 1162b are located at a second area S2, the locking protrusions 1162a and 1162b are not separated from the piston 1116.

Since the locking protrusions 1162a and 1162b should be moved to the first area S1 through a path P in order to be separated from the piston 1116, possibility of the above separation is very low during an operation of the transverse damper 1100.

Separation of the limiting member 1160 and the piston 1116 may be prevented through an assembling path of the locking protrusions 1162a and 1162b.

Meanwhile, another longitudinal rib 1119b which is not illustrated extends toward an end of the piston 1116 from the second transverse ribs 1118a and 1118b, and may extend from the same line as the longitudinal rib 1119a.

Referring to FIG. 19, a tub connector 1121 may be rotatably locked with a connection element locking part 1220 by a locking member such as a pin, a screw, and a bolt. The above embodiment has illustrated that the locking member is the tub connection pin 141, but the present invention is not limited thereto.

The connection element locking part 1220 is rotatably assembled with a second connection member 1120.

The connection element locking part 1220 rotatably couples the second connection member 1120 with the tub 20, and the second connection member 1120 may be rotated about the tub 20.

In detail, the connection element locking part 1220 includes a connector support plate 1221 and a locking part support plate 1222 configured to support the cylinder 1122.

The connector support plate 1221 is opposed to the locking part support plate 1222. A tub connector 1121 of the cylinder 1122 is disposed between the connector support plate 1221 and the locking part support plate 1222.

The connector support plate 1221 and the locking part support plate 1222 may be formed therein with locking holes 1221h and 1222h which are formed through the locking members.

A tub connection pin 141 passes through a locking hole 21h of a connector support plate 1221, a locking hole 1121h of a tub connector 1121, and a locking hole 1222h of a locking member support plate 1222.

The tub connector 1121 may further include a bushing (not shown) and a buffer member. In this case, after the buffer member 142 is inserted into the locking hole 1221h of the connector support plate 1221, the locking hole 1121h of the tub connector 1121, and the locking hole 1222h of the locking member support plate 1222, the bushing is inserted into the buffer member 142 and the tub connection pin 141 is inserted into the bushing.

The buffer member 142 may include a material having elasticity such as synthetic or natural rubber. The buffer member 142 and the bushing induce an easy rotation operation of the second connection member 1120 with respect to the tub 20, reduce occurrence of an abnormal noise, and improve assemblability.

The connector support plate 1221 and the locking member support plate 1222 may be connected by a connection plate 1223. In this case, the connection plate 1223 connects one side of the connection support plate 1221 to one side of the locking member support plate 1222.

Accordingly, one of the connector support plate 1221 and the locking member support plate 1222 is blocked by the connection plate 1223, and the other thereof is formed therein with an opening portion so that the second connection member 1120 may be rotated.

Meanwhile, in order to reinforce strength, at least one rib 1225a and 1125b for connecting the locking member support plate 1222 to the tub 20 may be formed.

At least one rib 1226a and 1126b for connecting the connector support plate 1221 to the tub 20 may be formed.

At least one rib 1226a and 1126b for connecting the connection plate 1223 to the tub 20 may be formed.

The connection element locking part 1220 may be manufactured as a component assembled with the tub 20, and may be coupled or merged by a locking member such as a screw, a bolt, and a nut.

In the present embodiment, the connection element locking part 1220 is integrally formed with the tub 20.

In the present embodiment, in order to install the upper transverse dampers 1100U, four connection element locking parts 1220 are formed at an upper portion of the tub 20. In order to install the lower transverse dampers 1100L, four connection element locking parts 1220 are formed at a lower portion of the tub 20.

A connection element locking part 1220 for locking the upper transverse damper 1100U and a connection element locking part 1220 for locking the lower transverse damper 1100L are indicated as 120U and 120L in FIG. 13, respectively.

The above transverse damper 1100 may be used as at least one of the upper transverse damper 1100U and the lower transverse damper 1100L. In the present embodiment, a structure of the transverse damper 110 is used in both of the upper transverse damper 1100U and the lower transverse damper 1100L.

The upper transverse damper 11000 is installed so that the damper holder 1140 may be moved along the support rod 61. The lower transverse damper 1100L is installed so that the damper holder 1140 may be moved along the guide pin 150.

What is different from the first embodiment is an assembling target. A coupling structure between the damper holder 1140, the first connection member 1110, the second connection member 1120, the friction element 1130, and the limiting member 1160 are substantially the same. Accordingly, a coupling structure between respective members is the same as above.

Hereinafter, an installation structure of the lower transverse damper 1100L will be described in detail.

Referring to FIG. 20 to FIG. 21, a base 1300a is formed therein with a hollow 1321h, and may include a boss portion 1320 extending to a upper part of the cabinet 10 from an inner side of the cabinet 10.

In detail, the base 1300a may include a flat base fan 1310. The boss portion 1320 extends to an upper part from the base fan 1310, and the hollow 1321h is vertically formed through the base fan 1310.

The boss portion 1320 may include an inner pipe portion 1321 formed therein with the hollow 1321h and an outer pipe portion 1322 forming a concentric circle with the inner pipe portion 1321 and disposed at an outer side of the inner pipe portion 1321.

In order to reinforce stiffness, a connection rib 1323 may be further formed between the inner pipe portion 1321 and the outer pipe portion 1322. The rib 1323 may be radially formed with respect to the concentric circle.

A support leg 1540 for supporting a washing machine may be installed at the boss portion 1320.

The support leg 1540 may include a support member 1541 formed through the base 1300a and a height control member 1542 screwed to the support member 1541. (see FIG. 24(b))

The support member 1541 may include a work-rest 1541a provided on a bottom and a support shaft 1541b extending from the work-rest 1541a. The work-rest 1541a is disposed at a lower side of the base 1300a and is provided on a bottom in which the washing machine is mounted. The support shaft

1541*b* is formed through the base fan 1310, and is inserted into a hollow 1321*h* of the boss portion 1320 disposed at a upper part of the base fan 1310.

The support member 1541 may be configured by a bolt, and the support shaft 1541*b* corresponds to a shaft of a bolt having an outer peripheral surface formed therein with a thread.

The height control member 1542 is formed at an inner peripheral surface of a hole through which the support member 1541 passes and may be informed therein with a thread tooth-engaged with a thread formed in the support shaft 1541*b*. In the present embodiment, the support shaft 1541*b* may be configured by a male screw, and the height control member 1542 may be configured by a female screw.

The support member 1541 may be coupled with or separated from the base 1300*a*.

After the support member 1541 is separated from the base 1300*a*, the height control member 1542 may be rotated using a tool such as a spanner or a wrench. Since the height control member 1542 is moved along the support member 1541, the height control member 1542 may control a position.

The height control member 1542 may couple the support member 1541 with the base 1320*a* while makes contact with a bottom surface of the base 1320*a* to control a height of the base 1320*a* with respect to the ground.

Unlike the present embodiment, a thread may be formed at an inner peripheral surface of the hollow 1321*h* and the support shaft 1541*b* may be coupled with the boss portion 1320 formed therein with the hollow 1321*h*.

A pin supporter 1400*a* is disposed on the base 1300*a* and may support the guide pin 150. The pin supporter 1400*a* may be manufactured as a component separately from the base 1300*a* and may be at least partially supported by the boss portion 1320.

The pin supporter 1400*a* may include a sidewall 1410 extending vertically, pin mounts 1421 and 1422 formed on the sidewall 1410 and in which a guide pin 150 is installed, and a pin support part 1430 supported by a boss portion 1320 of the base 1300*a*.

It is preferred that the pin supporter 1400*a* is manufactured as one component so that the sidewall 1410, the mounts 1421 and 1422, and the support part 1430 are integrally formed. A material of the pin supporter 1400*a* is a synthetic resin.

The pin supporter 1400*a* may include a pair of pin mounts 1421 and 1422 which are vertically spaced apart from each other. The first connection member 1110 may be moved between a pair of pin mounts 1421 and 1422. Hereinafter, a pair of pin mounts 1421 and 1422 is defined as a first pin mount 1421 and a second pin mount 1422.

Figure 22:
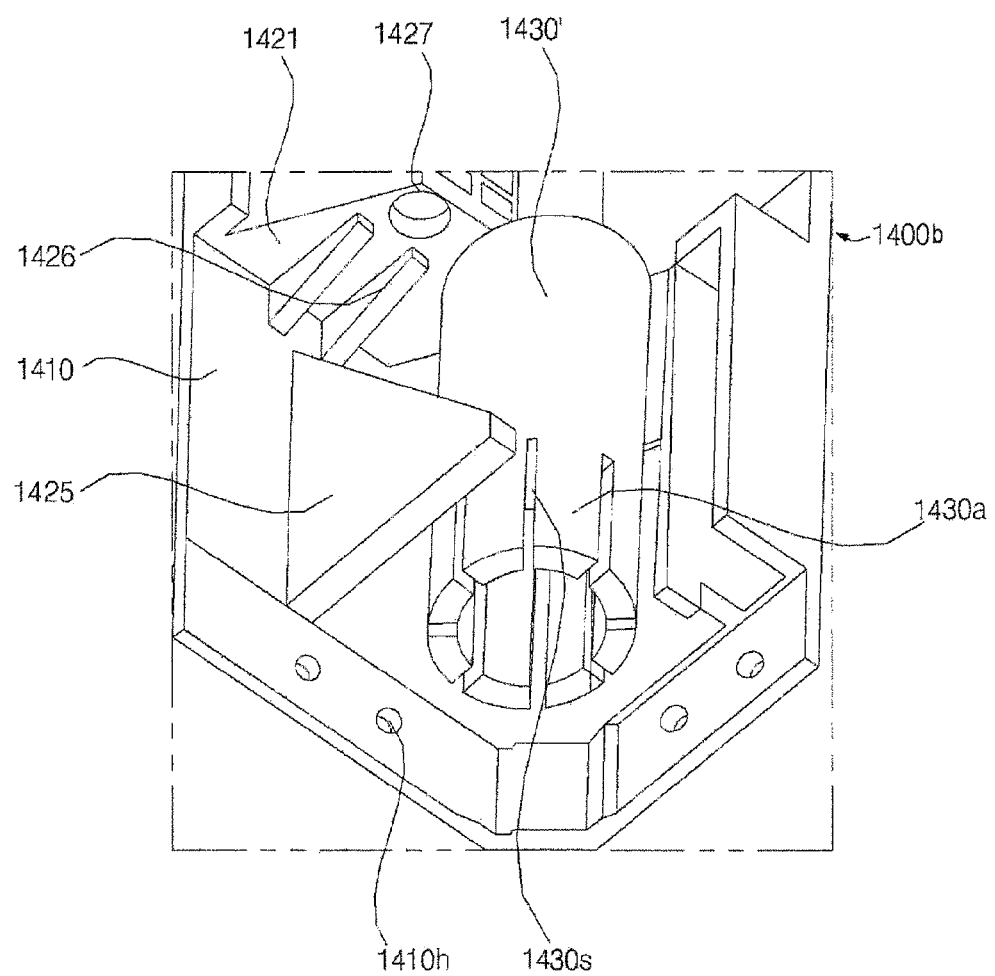
FIG. 22 partially shows a pin supporter according to a ninth embodiment of the present invention.

The first pin mount 1421 and the second pin mount 1422 may be formed therein with a pin installation hole 1427 of FIG. 22 in which the guide pin 150 is inserted. The guide pin 150 may be press-fitted according to the size of the pin installation hole 1427. In the present embodiment, a separate member may be further used for firm fixing. For example, a coupling means such as a sealer, a busing, and an O-ring may be lock to fill a gap between the pin installation hole 1427 and the guide pin 150.

When the guide pin 150 includes a metallic material, the guide pin 150 may be riveted to the first pin mount 1421 and the second pin mount 1422 by pressing both ends of the guide pin 150. Since the rivet is caught around the pin insertion hole, the guide pin 150 may be prevented from being separated from the pin mounts 1421 and 1422.

Meanwhile, a support rib 1426 may protrude from an inner side of the sidewall 1410. The support rib 1426 may be connected with bottom surfaces or top surface of the pin mounts 1421 and 1422.

The sidewall 1410 is located at an inner side of the cabinet 10. The sidewall 1410 includes an inner surface of the cabinet 10 and an outer surface opposed to the inner surface.

The pin mounts 1421 and 1422 may protrude in a transverse direction from an inner surface of the sidewall 1410.

The pin supporter 1400*a* may be disposed at each edge of the base 1300*a*. The sidewall 1410 may be configured in the form corresponding to an edge of the base 1300*a*.

In the present embodiment, the sidewall 1410 includes a first lateral surface 1411, a second lateral surface 1413 perpendicular to the first lateral surface 1411, and a connection surface configured to connect the first lateral surface 1411 to the second lateral surface 1412.

Since the first lateral surface 1411 and the second lateral surface 1413 are supported at an inner side of an edge of the cabinet 10, stiffness of the cabinet 10 may be reinforced.

A locking hole 1410*h* may be formed at a lower part of the sidewall 1410. A locking member such as a screw, a bolt, or a pin may be coupled with the base 1300*a* through the locking hole 1410*h*.

The base 1300*a* may be formed therein with a locking surface 1312 opposed to an inner surface of the sidewall around a base fan 1310. A locking member (screw or bolt) passing through the locking hole 1410*h* may be locked with the locking surface 1312.

In the present embodiment, a plurality of locking holes 1410*h* are formed at a bottom end of the first lateral surface 1411 and at a bottom end of the second lateral surface 1412. Unlike the present embodiment, a locking hole 1410*h* may be formed in the connection surface 1413.

A bottom end of a pin support part 1430 may make contact with a top end of an outer pipe part 1321. In the present embodiment, the pin support part 1430 is configured in the form of a pipe corresponding to the outer pipe part 1321.

In the present embodiment, the pin support part 1430 is spaced apart from the sidewall 1410, and may extend to a lower part from the first pin mount 1421. In this case, the first pin mount 1421 may be connected with the first lateral surface 1411, the connection surface 1413, and the second lateral surface 1412.

Unlike the present embodiment, the pin support part 1430 may be merged with an inner side of the sidewall 1410.

A reinforcing rib 1425 may protrude toward an inner side of the cabinet 10 from the sidewall 1410. The reinforcing rib 1425 vertically extends along an inner side of the sidewall 1410. A bottom end of the reinforcing rib 1425 is located on the base 1300*a* to support the sidewall 1410.

Hereinafter, remaining constituent elements are the same as those of the first embodiment, and the detailed description thereof will be omitted.

FIG. 22 partially shows a pin supporter according to a ninth embodiment of the present invention. Referring to FIG. 22, a pin supporter 1400*b* according to the present embodiment is different from the pin supporter according to the eighth embodiment that a configuration of the pin supporter 1400*a* and a pin support part 1430' are different from those, a remaining configuration is the same.

Unlike the eighth embodiment, in the pin supporter 1400*b* according to the present embodiment, a groove 1430*s* is formed in the pin support part 1430'.

The pin supporter 1400*b* is formed therein with a groove 1430*s* cut-away from a bottom end of the pin support part 1430' having a pipe shape along a longitudinal direction of a pipe. A plurality of grooves 1430s may be formed around the pin support part 1430'.

A plurality of taps 1430a divided by a groove 1430a are formed at a bottom end of the pin support part 1430'. The taps 1430' may be inserted between the inner pipe part 1321 and the outer pipe part 1322. A rib 1323 of a boss portion 1320 is inserted into the groove 1430s.

The pin support part 1430' may be firmly coupled with the boss portion 1320 by coupling of the groove 1430s and the rib 1323.

Hereinafter, remaining constituent elements are the same as those of the eighth embodiment, and the detailed description thereof will be omitted.

Figure 23:
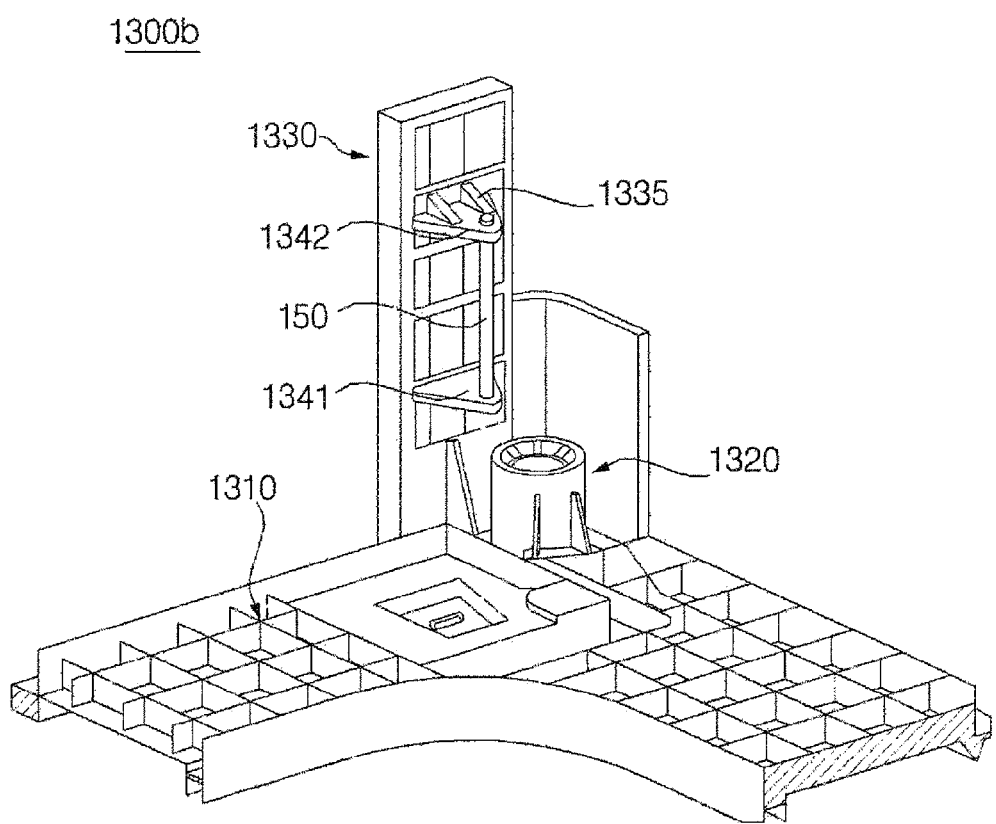
FIG. 23 partially shows a base according to a tenth embodiment of the present invention.

FIG. 23 partially shows a base according to a tenth embodiment of the present invention. Referring to FIG. 23, a base 1300b may further include a sidewall 1330. The sidewall 1330 extends to a upper part from the base fan 1310.

After the first pin mount 1341 and the second pin mount 1342 are manufactured as a separate component from the sidewall 1320, the first pin mount 1341 and the second pin mount 1342 may be assembled with the sidewall.

When manufactured by injection molding, since the sidewall extends to a upper part from the base fan 1310, the base 1300b may be blown downward from a mold.

Since the pin mounts 1341 and 1342 cross the blowing direction, it is difficult to integrally inject the sidewall 1330 and the pin mounts 1341 and 1342.

The pin mounts 1341 and 1342 are manufacture separately from the base 1300b, the pin mounts 1341 and 1342 may be locked with the sidewall 1330 by melting, bonding, and a locking member.

The base 1300b may further include a support rib 1335 protruding from the sidewall 1330. The support rib 1335 may be formed at a location making contact with a bottom surface of the first pin mount 1341 or a location making contact with a top surface of the second pin mount 1342.

Hereinafter, remaining constituent elements are the same as those of the eighth embodiment, and the detailed description thereof will be omitted.

Figure 24:
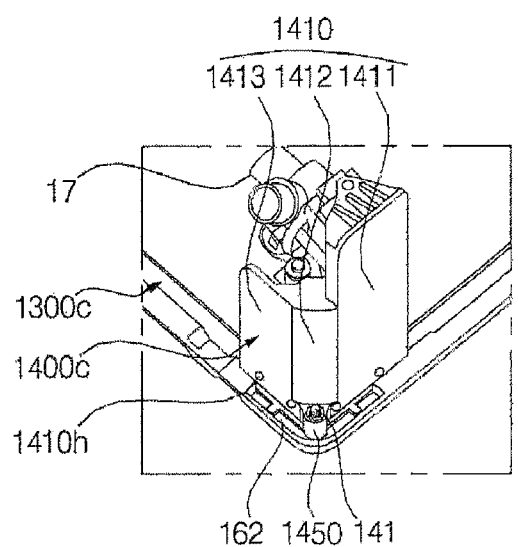
FIG. 24 shows an assembly state between the base and a pin support according to an eleventh embodiment of the present invention at various angles.
Figure 24:
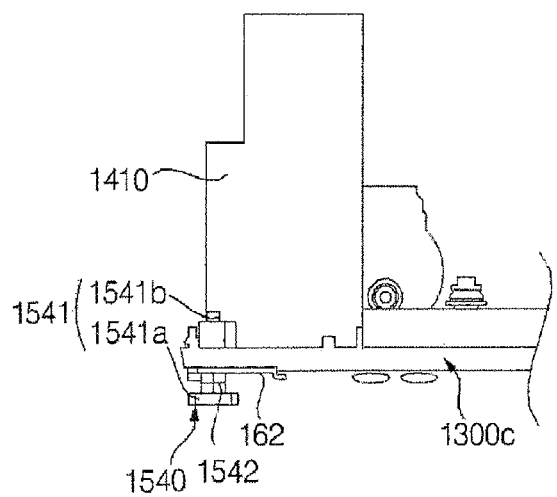
Figure 24:
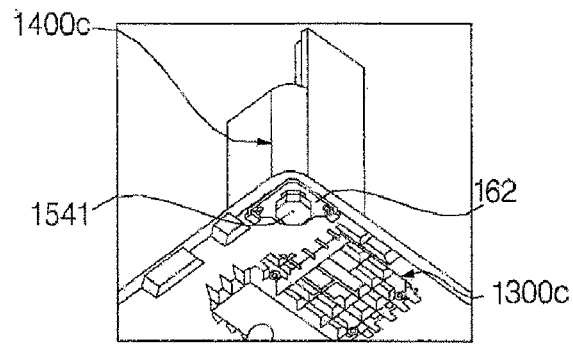

FIG. 24 shows an assembly state between the base and a pin support according to an eleventh embodiment of the present invention at various angles.

Referring to FIG. 24, unlike the eighth embodiment, the pin supporter 1400c according to the present embodiment, a coupling part 1450 coupled with the support member 1541 is further included.

The coupling part 1450 protrudes from an outer side of the pin supporter 1410. The coupling part 1450 is disposed at an upper part of the base 1300c and is locked with the support member 1541 formed through the base 1300c.

The coupling part 1450 may be screwed to the support member 1541, and may be screwed to a support shaft 1541b of the support member 1541.

In the present embodiment, a connection surface 1413 of the sidewall 1410 is formed therein with a curved surface bent along an edge of the base 1300c. It is preferred that the coupling part 1450 protrudes to the cabinet 10 from the connection surface 1412, and is coupled with a support shaft 1541b formed through an edge area of the base 1300c.

When comparing with FIG. 20 of the eighth embodiment, in the base 1300c, a part supported by a support leg 1540 is moved to an outer side of the sidewall 1410.

That is, vibration attenuation due to a lower transverse damper 1100L is achieved at an inner side of the sidewall 1410. A base 1300c is supported at an outer side of the sidewall 1410 by a support leg 1540. Since a part supported by the support leg 1540 is located closer than an edge of the base 1300c, the base 1300c may be stably supported.

When the base is firmly supported, vibration in an edge of the base 1300c may be reduced.

Meanwhile, a reference numeral which is not illustrated is a reinforcing plate coupled with a bottom surface of the base fan 1310, and is preferably formed by a metallic material.

Hereinafter, remaining constituent elements are the same as those of the eighth embodiment, and the detailed description thereof will be omitted.

Figure 25:
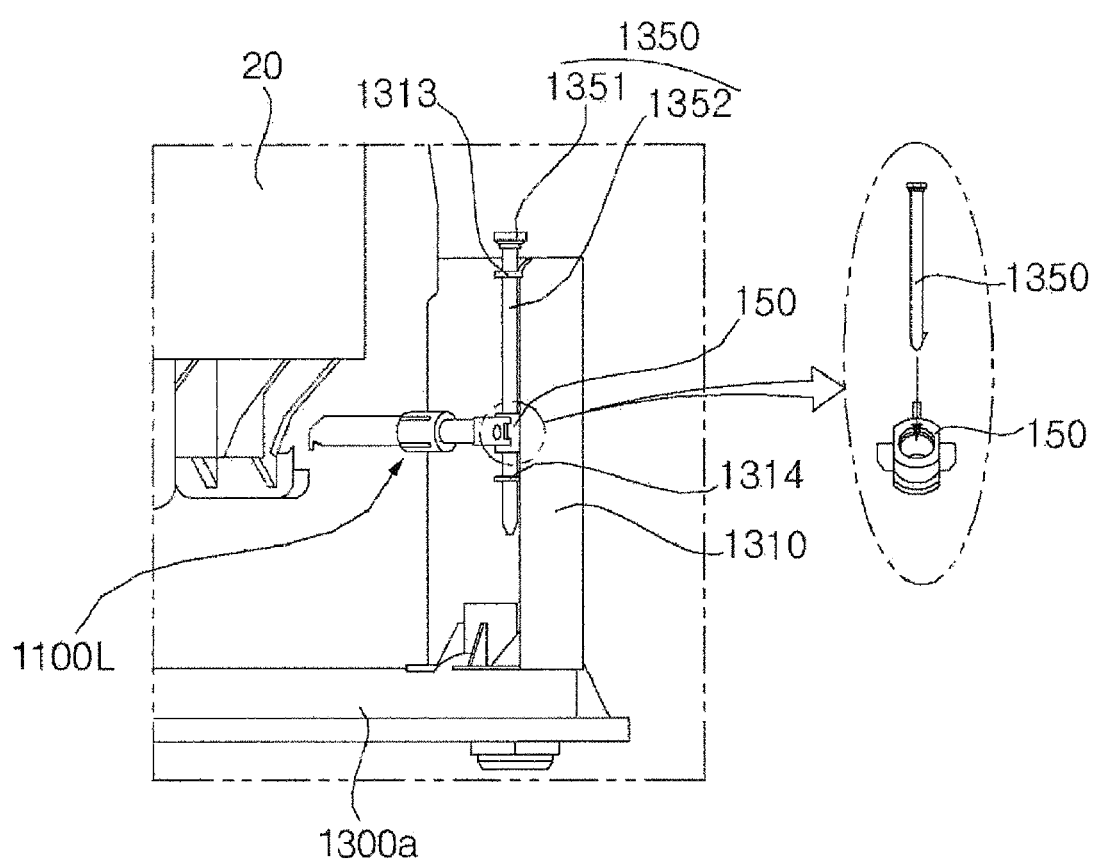
FIG. 25 and FIG. 26 show coupling structures between a lower transverse damper and a guide pin according to an twelfth embodiment of the present invention at various angles, respectively.
Figure 26:
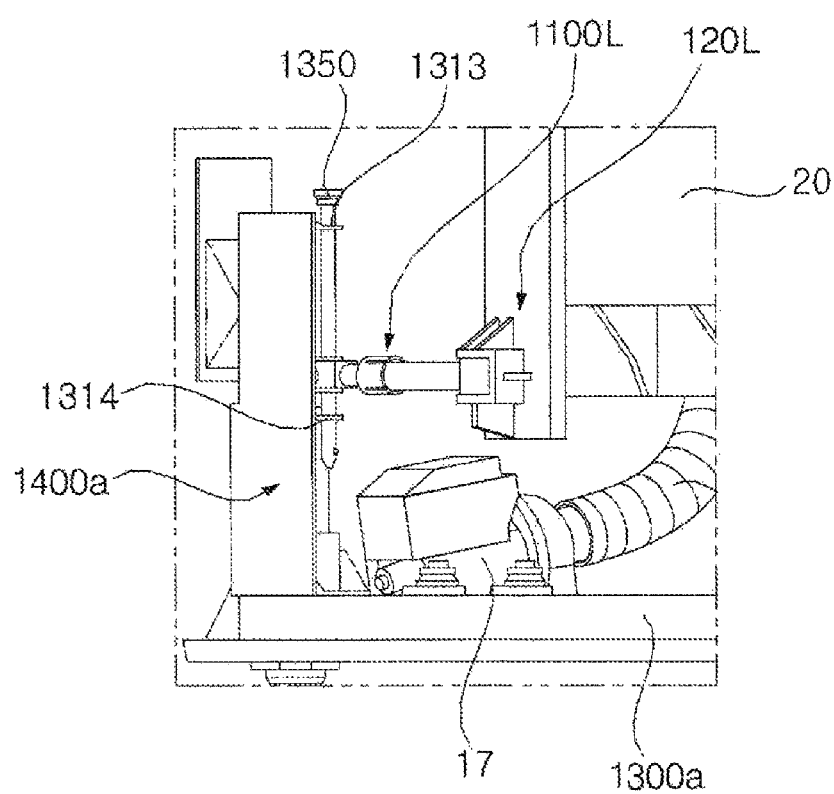
Figure 27:
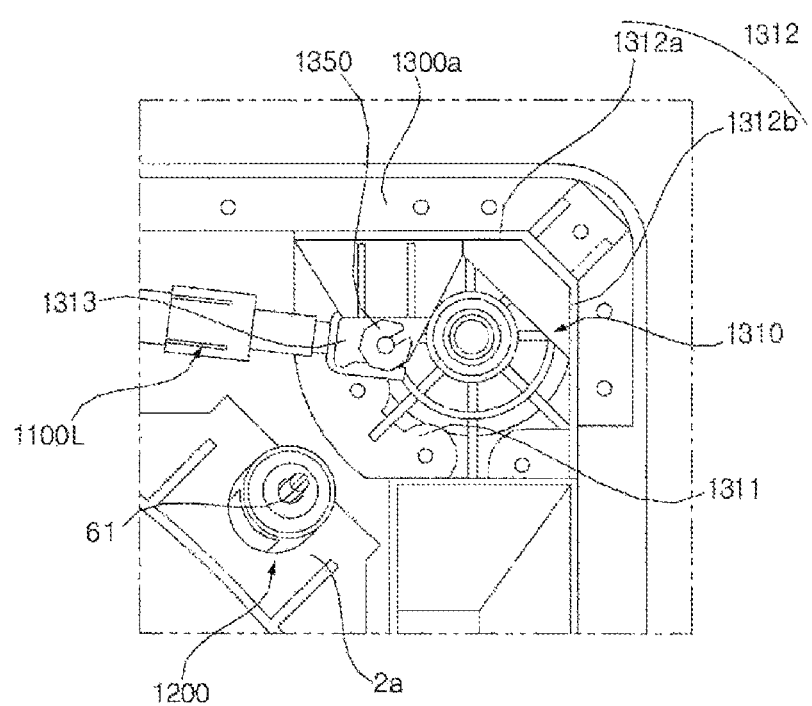
FIG. 27 is a view showing the lower transverse damper and the guide pin of FIG. 25 when viewed from the top.

FIG. 25 and FIG. 26 show coupling structures between a lower transverse damper and a guide pin according to an twelfth embodiment of the present invention at various angles, respectively, and FIG. 27 is a view showing the lower transverse damper and the guide pin of FIG. 25 when viewed from the top.

An installation structure of the guide pin 1350 according to the present embodiment is different from an installation structure of a guide pin 1350 according to the eighth embodiment.

A lower transverse damper 1100L may be moved along a guide pin 1350 disposed at a cabinet 10.

A pin supporter 1310 may be installed on a base 1300a by a locking member such as a screw or a bolt.

The pin supporter 1310 may include a support plate 1311 locked with a base 1300a and at least one sidewall 1312 extending to a upper part from the support plate 1311.

In the present embodiment, the support plate 1311 and the sidewall 1312 are integrally manufactured. The pin supporter 1310 is manufactured to including a support plate 311 and a sidewall 312 by suitably cutting and bending one metallic plate. Unlike the present embodiment, the support plate 1311 and the sidewall 1312 may be manufactured as a separate component to be assembled.

The support plate 1311 is located at an upper part of the base 1300a. The support plate 1311 may be locked with the base 1300a.

The pin supporter 1310 may be disposed at an edge of the base 1300a. A flat section of the sidewall 1312 may be manufactured to have an I' shape corresponding to a location of an edge of the base 1300a. The sidewall 1312 may include a first lateral surface 312a and a second lateral surface 312b which is perpendicular to each other.

At least two guide pin holders 1313 and 1314 are disposed at the pin supporter 1310. The guide pin holders 1313 and 1314 are vertically spaced apart from each other, and a guide pin 1350 is inserted into the guide pin holders 1313 and 1314.

The guide pin 1350 is stood while passing through at least two guide pin holders 1313 and 1314. The guide pin holders 1313 and 1314 may have a ring shape including a hole formed through the guide pin 1350. The guide pin holders 1313 and 1314 may be manufactured by processing one metallic plate. The guide pin holders 1313 and 1314 may be integrally formed with the sidewall 1312.

The guide pin 1350 is inserted into a damper holder 150. The damper holder 150 is disposed between two guide pin holders 1313 and 1314.

An upward movable range of the damper holder 150 is limited by a first guide pin holder 1313 which is located upward and a lower movable range thereof is limited by a second guide pin holder 1314 which is located downward.

It is preferred that the first guide pin holder 1313 is located higher than a damper holder 150 in a non-load state where the drum 30 and the tub 20 are empty.

It is preferred that the second guide pin holder 1314 is located lower than a damper holder 150 in a preset maximum load state.

Meanwhile, the guide pin 1350 may include a head 1351 and a pin portion extending from the head 1351. The pin portion 1352 sequentially passes through the first and second guide pin holders 1313 and 1314 from upward to downward. The head 1351 is caught at the first guide pin holder 1313 without passing through the first guide pin holder 1313.

A connection element locking part 1220 with which the transverse damper 1100 is assembled may include a lower connection member locking portion 120L to install the lower transverse damper 1100L and an upper connection member locking portion 120U to install the lower transverse damper 11000.

The lower connection member locking portion 120L is located closer than a center of the tub 20 as compared with the upper connection member locking portion 120U. In an aspect of an outer appearance, the lower connection member locking portion 120L is formed at an internally retracted part of the tub 20 as compared with the lower transverse damper 11000.

Hereinafter, remaining constituent elements are the same as those of the eighth embodiment, and the detailed description thereof will be omitted.

Although embodiments of the present invention have been described with reference to a number of illustrative embodiments thereof, it should be understood that numerous other modifications and embodiments can be devised by those skilled in the art that will fall within the spirit and scope of the principles of this disclosure. A detailed description of the accompanying drawings and the invention are only an embodiment of the present invention, which are used for the purpose of describing the present invention but are not used to limit the meanings or a range of the present invention described in claims.

The invention claimed is:

1. A laundry processing apparatus comprising:
    a cabinet;
    a tub, arranged in the interior of the cabinet, for storing laundry water;
    longitudinal dampers connecting the cabinet and tub and supporting the tub as same hangs from the cabinet;
    an upper transverse damper, connecting the upper part of the tub and cabinet, for reducing the horizontal vibration for the tub;
    a lower transverse damper, connecting the lower part of the tub and cabinet, for reducing the horizontal vibration for the tub;
    an upper guide pin fixed to an upper part of the cabinet and extending vertically;
    a lower guide pin fixed to a lower part of the cabinet and extending vertically; and
    a tub guide pin transversely installed at an outer peripheral surface of the tub;
    wherein the cabinet comprises:
        a cabinet base;
        a cabinet body coupled with a peripheral region of the cabinet base to form a lateral surface; and
        a top cover coupled with an upper part of the cabinet body and including the upper part formed therein with an introduction hole;
    wherein the upper guide pin is disposed in the top cover,
    wherein the lower guide pin is disposed in the cabinet base,
    wherein the upper guide pin is disposed higher than lower guide pin,
    wherein the upper transverse damper is connected to the upper guide pin and upper part of the tub,
    wherein the lower transverse damper is connected to the lower guide pin and lower part of the tub, and
    wherein an inner side of at least one of the upper transverse damper or the lower transverse damper is horizontally moved along the tub guide pin.

2. The laundry processing apparatus of claim 1, wherein a plurality of upper transverse dampers are disposed based on a vertical axis of the tub at a same interval.

3. The laundry processing apparatus of claim 1, wherein a plurality of the lower transverse dampers are disposed based on a vertical axis of the tub at a same interval.

4. The laundry processing apparatus of claim 1, wherein an outer side of at least one of the upper transverse damper and the lower transverse damper is disposed at an edge of the cabinet.

5. The laundry processing apparatus of claim 4, wherein the inner side of at least one of the upper transverse damper or the lower transverse damper is disposed perpendicular to an outer peripheral surface of the tub.

6. The laundry processing apparatus of claim 4, wherein the inner side of at least one of the upper transverse damper or the lower transverse damper is disposed to form an acute angle with an outer peripheral surface of the tub.

7. The laundry processing apparatus of claim 1, further comprising a tub guide pin transversely installed at an outer peripheral surface of the tub, and
    wherein the inner side of at least one of the upper transverse damper or the lower transverse damper is horizontally moved along the tub guide pin.

8. The laundry processing apparatus of claim 1, further comprising a guide pin fixed to the cabinet and extending vertically,
    wherein at least one of the upper transverse damper or the lower transverse damper is coupled with the guide pin, and
    when vibration occurs in the tub, the at least one of the upper transverse damper or the lower transverse damper is movable in a vertical direction along the guide pin.

9. The laundry processing apparatus of claim 1, wherein at least one of the inner side of the upper transverse damper coupled with the tub or the inner side of the lower transverse damper coupled with the tub is rotatably coupled with the tub.

* * * * *